(12) United States Patent
Raynor

(10) Patent No.: US 11,006,076 B1
(45) Date of Patent: May 11, 2021

(54) METHODS AND SYSTEMS FOR CONFIGURING MULTIPLE LAYOUTS OF VIDEO CAPTURE

(71) Applicant: Facebook, Inc., Menlo Park, CA (US)

(72) Inventor: Anne Raynor, Menlo Park, CA (US)

(73) Assignee: FACEBOOK, INC., Meno Park, CA (US)

( * ) Notice: Subject to any disclaimer, the term of this patent is extended or adjusted under 35 U.S.C. 154(b) by 0 days.

(21) Appl. No.: 16/731,263

(22) Filed: Dec. 31, 2019

(51) Int. Cl.
G06F 3/048 (2013.01)
H04N 7/15 (2006.01)
G06F 3/0481 (2013.01)
H04N 7/14 (2006.01)

(52) U.S. Cl.
CPC .......... H04N 7/152 (2013.01); G06F 3/0481 (2013.01); H04N 7/147 (2013.01); H04N 7/155 (2013.01)

(58) Field of Classification Search
CPC ........ H04N 7/152; H04N 7/147; H04N 7/155; G06F 3/0481
See application file for complete search history.

(56) References Cited

U.S. PATENT DOCUMENTS

| | | | | |
|---|---|---|---|---|
| 9,077,850 | B1* | 7/2015 | Groves | H04N 7/155 |
| 2009/0257730 | A1* | 10/2009 | Chen | G11B 27/034 |
| | | | | 386/278 |
| 2011/0102671 | A1* | 5/2011 | Tsai | G09G 5/393 |
| | | | | 348/441 |
| 2011/0249073 | A1* | 10/2011 | Cranfill | H04N 5/2258 |
| | | | | 348/14.02 |
| 2015/0271444 | A1* | 9/2015 | Defazio | H04N 7/15 |
| | | | | 348/14.07 |
| 2015/0358578 | A1* | 12/2015 | Lee | H04N 7/141 |
| | | | | 348/14.01 |
| 2017/0186127 | A1* | 6/2017 | Yu | G06F 3/04845 |
| 2017/0277403 | A1* | 9/2017 | Huang | G06F 3/04845 |
| 2017/0289208 | A1* | 10/2017 | Peevers | H04L 67/10 |
| 2017/0318327 | A1* | 11/2017 | Mun | H04N 21/42209 |
| 2018/0048860 | A1* | 2/2018 | Gwock | H04N 7/147 |

\* cited by examiner

*Primary Examiner* — Rashawn N Tillery
(74) *Attorney, Agent, or Firm* — Kacvinsky Daisak Bluni PLLC

(57) ABSTRACT

Exemplary embodiments relate to techniques for providing modifiable views when capturing an image of a video call. When a user takes a picture of a video call (e.g., a screen shot), associated applications may scrape the phone of the call participants to acquire a better-quality image than what might be displayed in the call interface, which may be of reduced quality due to compression and/or bandwidth limitations. Problematically, the layout of the call interface is different on each user's device, which can cause the resulting screenshot to not look as expected. Exemplary embodiments therefore place the data scraped from each device into movable elements, which can be rearranged on the screen to alter the layout (even post-capture). Moreover, new layouts are possible, potentially with additional graphical elements. In some embodiments, information gathered from a user's social networking information can determine the layout parameters.

20 Claims, 14 Drawing Sheets

Interface Logic
450

Interface Logic
*450*

METHODS AND SYSTEMS FOR CONFIGURING MULTIPLE LAYOUTS OF VIDEO CAPTURE

BACKGROUND

Some communications services allow users to engage in video calls on mobile and/or non-mobile devices (e.g., mobile phones, dedicated devices, television sets, computers, etc.). Video calls are presented in a user interface. Typical interfaces show a preview of the video feed being broadcast from the local user device, a primary view that shows the currently-speaking user, optional secondary views that show the other participants in the call and/or a roster that depict static images of the other participants.

DETAILED DESCRIPTION

In some circumstances, a participant in a video call may wish to capture an image of the video call—for example, the participant may instruct their device to capture a screenshot of the video call's interface at a given moment in time. The participant might wish to do this to capture an interesting moment in the video call for future reference, or to be used as a post, story, status update, etc. in a social network.

Consider, for example, the use case where a grandmother is celebrating her 100$^{th}$ birthday, and her family throws a party for her. Perhaps some of her grandchildren live far away and are not able to attend, so one of the party participants initiates a video call with the absent grandchildren so that they can sing "Happy Birthday" to their grandmother. During the video call, one of the absent grandchildren might capture a screenshot of the video call and post the screenshot as a status update in their social networking account.

Figure 1B:
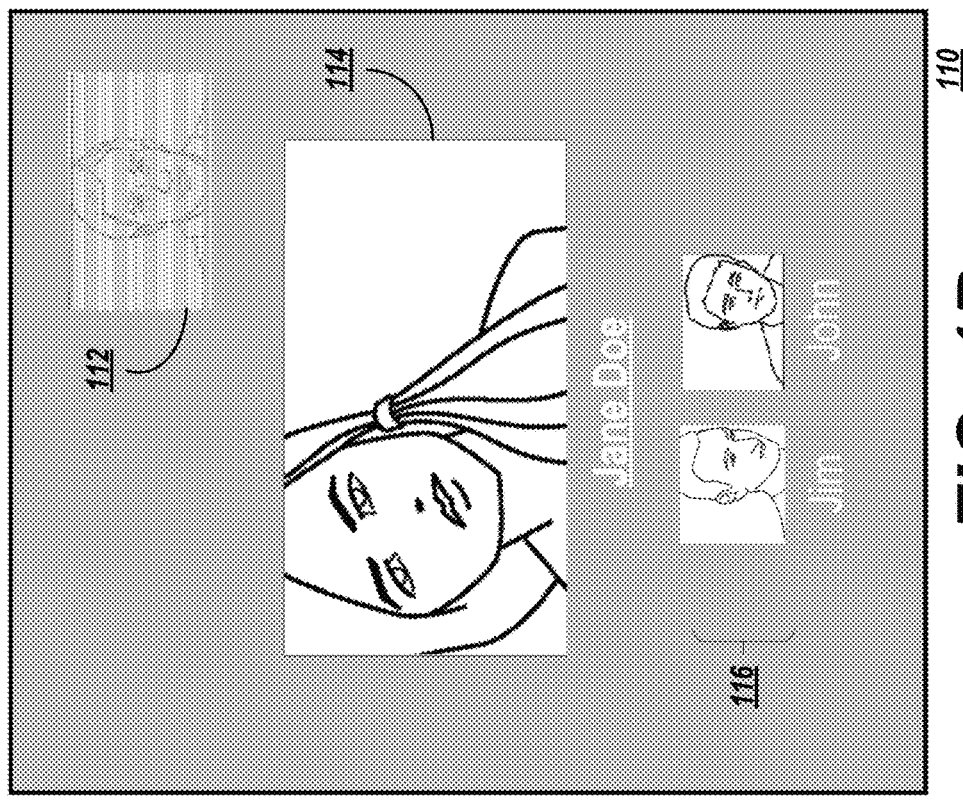
FIG. 1B depicts an exemplary interface for a video call as viewed from a user device of a first participant in the video call.
Figure 1A:
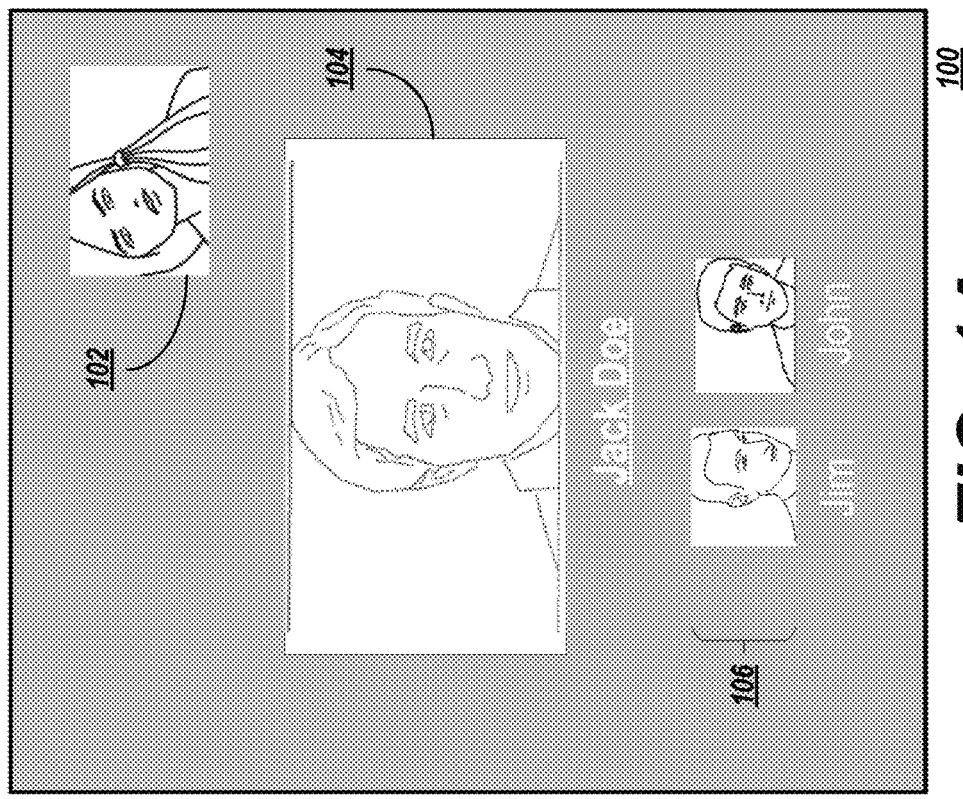
FIG. 1A depicts an exemplary interface for a video call as viewed from a user device of a first participant in the video call.

Several problems can arise when capturing an image of a video call. One issue, illustrated in FIGS. 1A and 1B, is that the view of the interface may appear differently on each participant's device. Typically, the video feed captured from the local device (FIG. 1A) appears in a small preview window 102 of the interface 100, while the feed of the current speaker is shown in a larger, main window 104. In the example of FIG. 1A, Jane Doe is the local user and appears in the preview window 102, whereas Jack Doe is the current speaker and is shown in the main window 104. Other participants that are not the main speaker may be shown in a roster 106, which may include smaller versions of the video feed and/or static images of the participants. The local feed typically does not appear in the main window 104, even if the local user is the current speaker. Accordingly, if the local user is speaking, the previous speaker generally remains in the main window 104 (assume in this case that Jane is currently speaking after Jack was the previous speaker). Thus, if the local user (Jane) captures a screenshot of the conversation, the screenshot may show the previous speaker in the large main window 104.

However, if another participant captures a screenshot at the same time (FIG. 1B), the view may appear differently. FIG. 1B is an interface 110 shown from the perspective of the device of Jack Doe. In this case, Jack is the local user and his feed is shown in the preview window 112. Because Jane is the current speaker, Jane's feed is shown in the main window 114 while Jack's is shown in the preview window 112. Jack's interface 110 also includes a roster 116 of the other participants.

Therefore, if Jane captures an image of her interface 100 at time to, and Jack captures an image of his interface 110 at the same time to, the two screenshots will show the same conversation but will nonetheless appear differently.

These inconsistent views may even give an incorrect impression of what the user is trying to convey, or focus on, by posting the screenshot. Consider again the example of a video of a grandmother's birthday. It may be that the focus of attention is on the party, rather than the absent grandchildren's video feeds. However, if the person whose device is present at the party captures a screenshot, the party will appear in the smaller preview window, whereas the main window will show the absent grandchildren singing happy birthday. This may give the impression that the user capturing the screenshot wishes to focus a viewer's attention on the grandchildren, rather than the party. If the grandchildren posted a screenshot from their own local devices captured at the same time, the party would appear in the main window, and therefore the focus would likely be on the party instead of the grandchildren.

Furthermore, the images shown on the video call interface may be of relatively low quality. When the images captured by the device camera are prepared for transmission into a video call, they are typically encoded in a way that reduces their quality (e.g., lowering resolution, compressing the image, etc.). This may make the screenshot a poor representation of the conversation, which may lower its value as an update or post.

The user may wish to focus on a particular aspect of the video, such as the events occurring in the background of their own local video feed, or the reaction from one of the other participants. Perhaps, for instance, one of the other participants whose video feed appears as a small video in the roster 106 reacts to something that is said in the main interface 104 in an amusing way (e.g., they make a funny face). The user posting the screenshot may wish to crop out some aspects of the interface to focus on other aspects. As a result of the reduced image quality, it may be difficult to obtain a high-quality image, especially when a relatively small portion of the interface is cropped.

Exemplary embodiments described herein address these and other issues. They can be used to ameliorate the inconsistent views that may result from capturing an image of a video call and may provide higher quality pictures of various video feeds in the conversation.

In exemplary embodiments, when a user takes a picture of a video call the video call application may scrape the memory of the device of the local user to get a better-quality image than what might be displayed in the call interface. The application may also request that corresponding applications on the devices of the other participants in the call similarly scrape their own memories and transmit corresponding high-quality images.

The images may be stored as moveable elements in the interface. The moveable elements may be resized, removed, moved to a new location, etc. This may allow one user to reconstruct the interface of another user, to put the focus on a particular participant feed, or crop out interface elements to focus on one or more feeds. These moveable elements may be stored in an interface structure so that they can be rearranged to alter the layout, even post-capture.

Figure 1D:
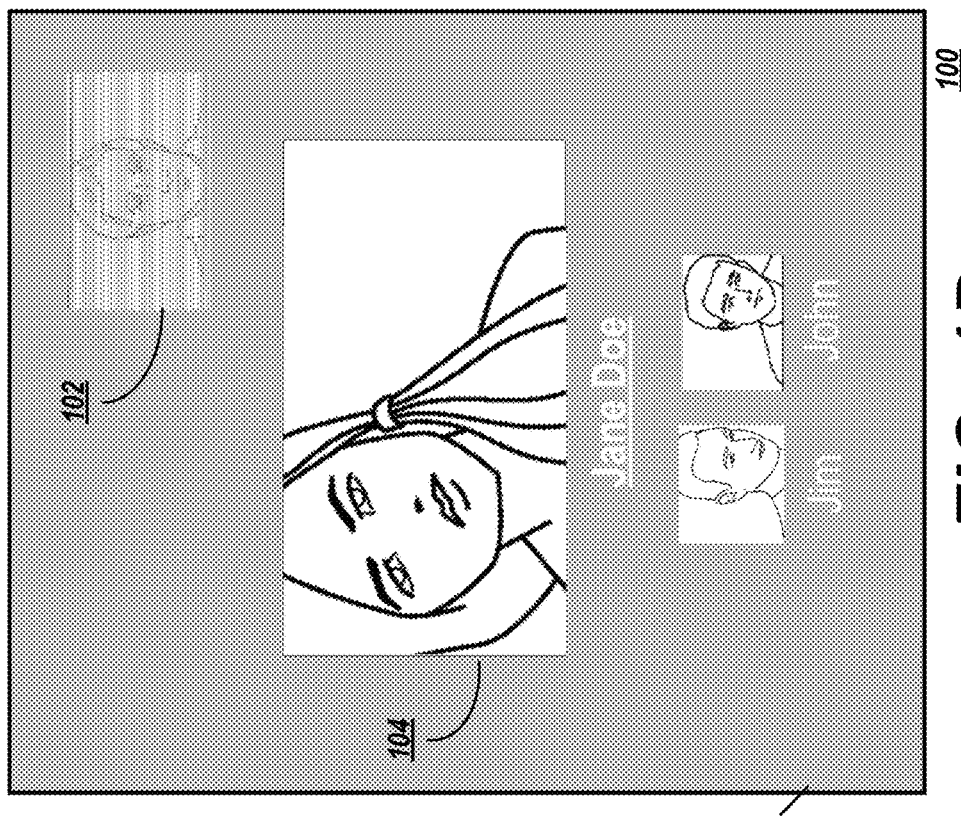
FIGS. 1C-1D depict the interface of the first participant as it is altered, according to an exemplary embodiment.
Figure 1C:
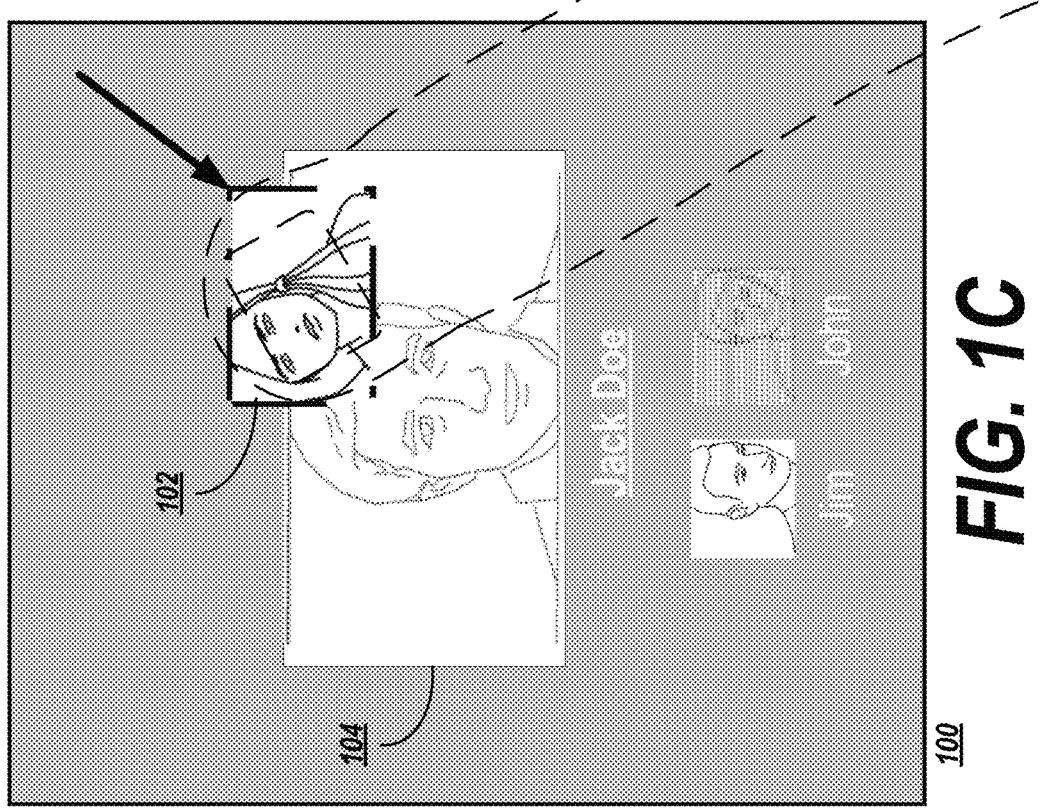

For example, FIG. 1C depicts an example of the interface 100 as the user touches the image of the video feed from the preview interface and drags it to the location of the main interface 104. In this embodiment, the interface is constrained to maintain a consistent layout, so the position and size of the two video feeds are swapped (FIG. 1D). Alternatively or in addition, the layout may be unconstrained or partially constrained so that the moveable elements can be rearranged and resized to create new layouts. In further embodiments, users may select a particular participants in the video call, and request that the interface be rearranged to depict the interface as it appeared on the selected user's device at the time the image of the interface was requested.

Figure 1E:
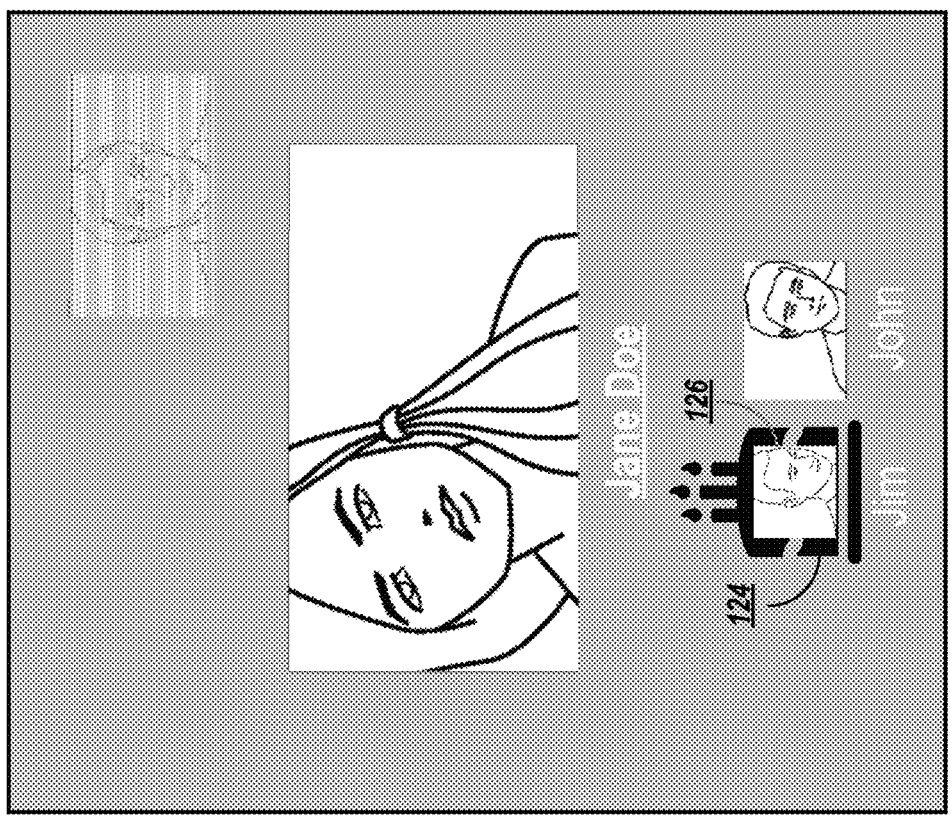
FIG. 1E depicts the interface of the first participant after graphical elements have been added to it, according to an exemplary embodiment.

Moreover, the user can move the moveable elements to create new layouts and add additional graphical elements (e.g., icons, images, GIFs, etc.; some examples include adding hearts around one or more users, placing a birthday cake around a main participant and putting and other users in balloons, adding a photo strip around the roster, etc.). An example wherein a participant "Jim" is having a birthday is depicted in FIG. 1E. In this example, the feed 126 from Jim is surrounded by a graphical element 124 depicting a birthday cake.

In some embodiments, the system may gather information from a social network or elsewhere in order to determine layout parameters—for instance, in the birthday cake example it may be desirable to ensure that the person having a birthday always appears in the birthday cake, regardless of how the moveable elements of the interface are rearranged.

This brief summary is intended to serve as a non-limiting introduction to the concepts discussed in more detail below. However, before discussing further exemplary embodiments, a brief note on data privacy is first provided. A more detailed description of privacy settings and authentication will be addressed in connection with the following Figures.

A Note on Data Privacy

Some embodiments described herein make use of training data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Assuming a user's privacy conditions are met, exemplary embodiments may be deployed in a wide variety of messaging systems, including messaging in a social network or on a mobile device (e.g., through a messaging client application or via short message service), among other possibilities. An overview of exemplary logic and processes for engaging in synchronous video conversation in a messaging system is next provided As an aid to understanding, a series of examples will first be presented before detailed descriptions of the underlying implementations are described. It is noted that these examples are intended to be illustrative only and that the present invention is not limited to the embodiments shown.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-*a* may include components 122-1, 122-2, 122-3, 122-4, and 122-5. The embodiments are not limited in this context.

Exemplary System Configuration and Data Structures

Figure 2A:
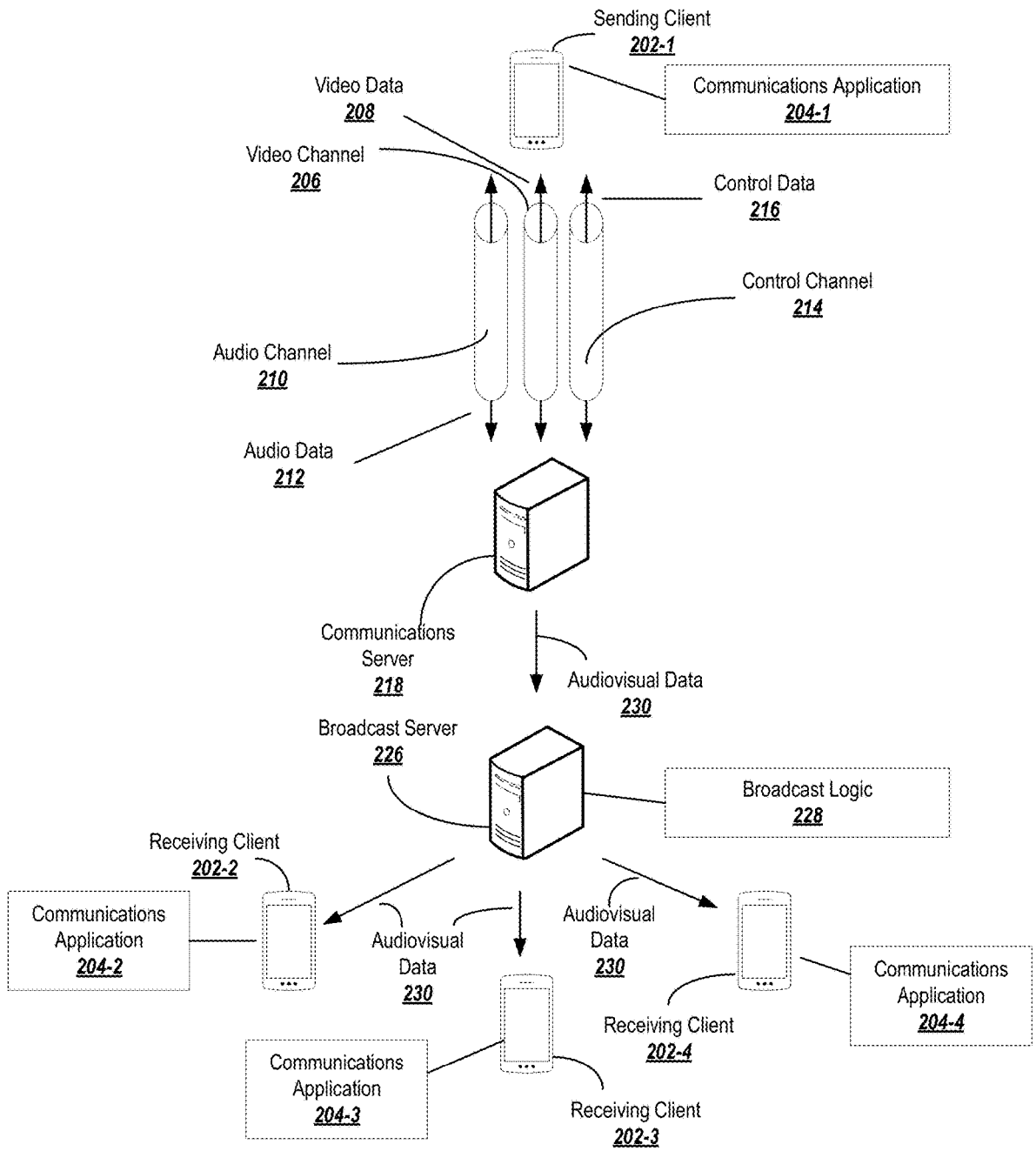
FIG. 2A is a block diagram depicting an exemplary client/server environment suitable for use with exemplary embodiments.

FIG. 2A depicts an exemplary system for coordinating a video call. The system may facilitate a video communication, which may be (e.g.) a one-to-one, one-to-many, or group communication. Alternatively or in addition, the system may facilitate another type of coordinated activity (e.g., games, interactive viewing experiences, etc.). An example will be described below with reference to a video conversation; however, it is understood that the present application is not limited to this example.

A sending client 202-1 may be a device associated with a first participant in a communication. The sending client 202-1 may be, for example a mobile device (although the present invention is not limited to application by mobile devices) executing a communications application 404-1 for participating in a video communication for a video-based call, with one or more other participants.

The communications application 204-1 may cause information associated with the video communication to be transmitted to one or more servers that facilitate the communication. For example, the information may include video data 208 containing video frames associated with the communication, audio data 212 containing sound information to be synchronized with the graphical frames, and control data 216. The control data 216 may include various instructions, identifiers, metadata, etc. used to apply effects that are associated with (e.g., synchronized to) the video data 208 and the audio data 212 and coordinate a capture of an image of the interface for the conversation.

In some examples, the image of the interface may be captured by the application 204-1. In others, the application 204-1 may request capture of the interface via appropriate commands (e.g., application programming interface commands) or references, and the actual capture may take place on the communications server 218.

Each type of data may be transmitted in an associated channel. For example, the communications application 204-1, or another component of the client 202-1, may open a video channel 206, an audio channel 210, and a control channel 214 with the media effect server 218. The video channel 206 may carry only video data 208 in a video format. Thus, the communications server 218 may treat any data received on the video channel 206 as data in a video format and may process the data appropriately. Similarly, the audio channel 210 may carry only audio data 212 in an audio format.

It is understood that the present invention is not limited to transmitting video data 208 and audio data 212 on video channels 206 and audio channels 210, respectively. For example, graphical data may be shared in a data channel in the case where graphical elements are applied to the interface. In another example, game data may be shared in a data channel dedicated to carrying information about the state of the game. For a shared listening experience (e.g., multiple users listening to a music album or concert at the same time), the channels may include an audio channel 210 but no video channel 206. In each case, the control channel 414 may be a real-time channel that is separate and distinct from the data channels.

The control channel 214 may transmit generic data that is not necessarily in a predetermined format, or may transmit control instructions in a specified control format. For example, the control channel 214 may carry an instruction to analyze the video data 208 and/or audio data 212, or may carry an instruction to apply a coordinated effect. The control channel 214 may be, for example, a Web Real Time Communications (WebRTC) channel.

The video channel 206, audio channel 210, and control channel may carry information in both directions. Thus, for example, the video channel 206 and audio channel 210 may carry data for display/playback on the sending client 202-1 (e.g., data relating to the video streams of one or more recipient clients 202-2, 2-3, 202-4). The control channel 214 may carry recommendations from the media effect server 218, one or more identified emotional states, other instructions, etc.

The communications server 218 may include audiovisual compilation logic for combining the video data 208, the audio data 212, and any applied graphical elements. The audiovisual compilation logic 224 may include logic for synchronizing the audio data 212 with the video data 208.

Once combined, the resultant audiovisual data 230 may optionally be transmitted from the communications server 218 to a broadcast server 226. The broadcast server 226 may include broadcast logic 228 that identifies one or more recipient clients 202-2, 202-3, 202-4 associated with the video communication. The broadcast server 226 may transmit the audiovisual data 230, which includes the audio data 212 and the video data 208 to each of the recipient clients 202-2, 202-3, 202-4. In some cases, the audiovisual data 230 may be broadcast to all recipients 202-2, 202-3, 202-4, but messages related to interface capture may be transmitted on respective control channels 206 to recipient clients 202-*i* whose coordination is required or helpful to facilitate capture of the interface. In some embodiments, the control data 216 may also be provided to some or all recipient clients 202-*i*.

Although FIG. 2A depicts a particular example involving coordination between a client and a server, it is noted that the present invention is not limited to such embodiments. In other examples, multiple servers may be used, or no servers may be used. For instance, in a peer-to-peer implementation, the sending client 202-1 may communicate directly with the recipient clients 202-2, 202-3, 202-4, without the aid of the intervening communications server 218 and/or broadcast server 226. In some embodiments, the clients 202-*i* may communicate in a peer-to-peer manner, but may be supported by one or more servers (e.g., a server storing a graphical element library).

Exemplary System Configuration

Figure 2B:
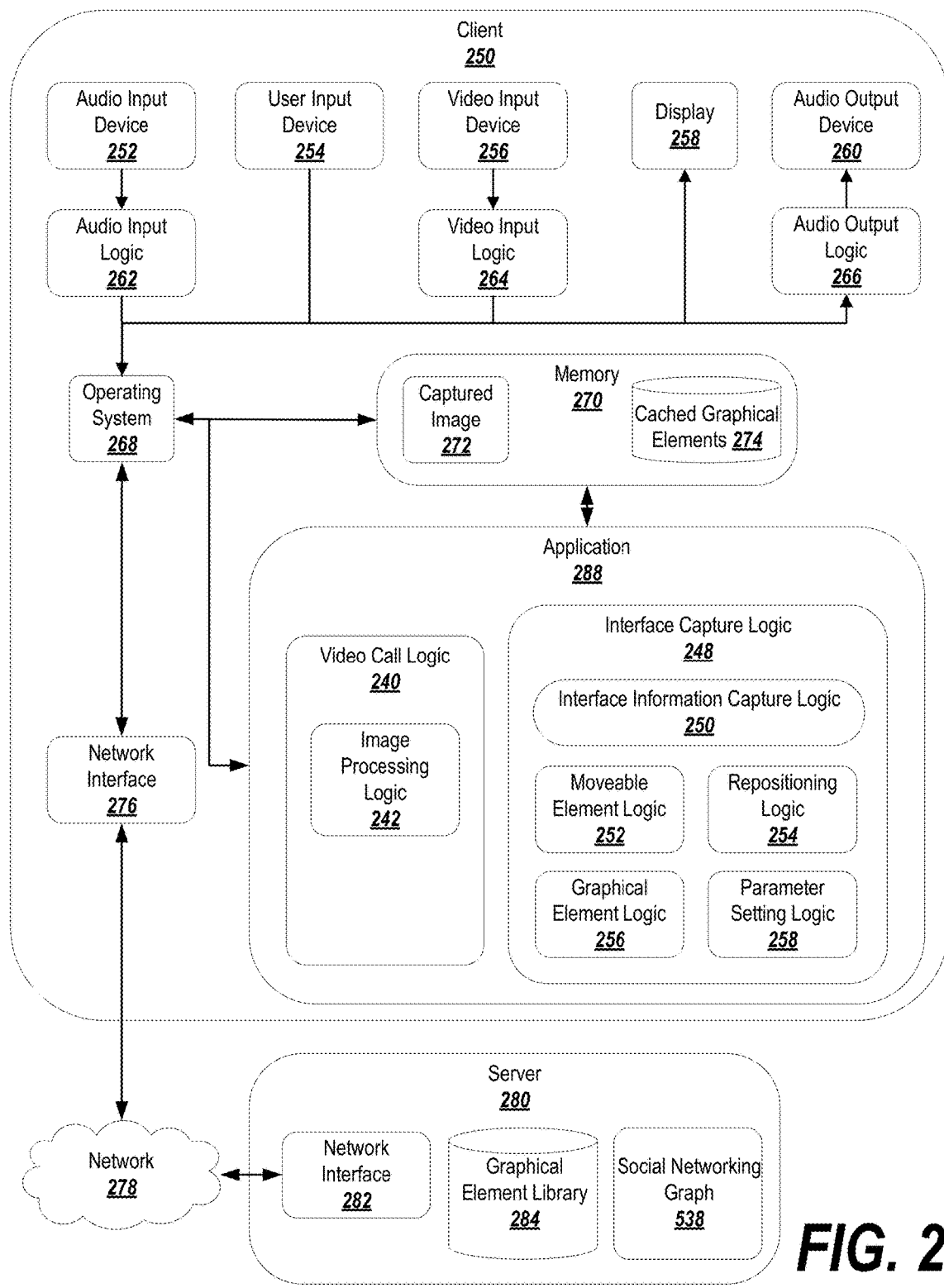
FIG. 2B depicts an exemplary client device in more detail.

FIG. 2B is a block diagram depicting an exemplary video chat device suitable for use with exemplary embodiments.

A client 250 may be used to record a video and/or play an audio/video feed. The client 250 may be, for example, a computer, a mobile device, a special-purpose video chat device, or any other suitable client device.

The client 250 may include an audio input device 252, such as a microphone. The audio input device 252 may record audio in the vicinity of the client device and forward the recorded audio to audio input logic 262 for processing. The audio input logic 262 may process the recorded audio. The audio input logic 262 may, for example, perform speech-to-text processing, analyze tone and/or pitch in the audio, etc.

The client 250 may further include a user input device 254, such as a physical or on-screen keyboard for entering text or a haptic interface for registering user contact with a display device.

The client 250 may include a video input device 256, such as a camera capable of recording video. Video input logic 264 may process incoming video, for example to be used by the video call logic 240 and/or the interface capture logic 248.

The client 250 may include a display 258, such as a touch screen or other display device. The display 258 may display a video call interface as depicted in FIGS.

The client 250 may include an audio output device 260, such as a speaker or audio output jack. The audio output device 260 may play the audio of a video stream of the video call. The audio output device 260 may receive the audio through audio output logic 266, which may work in conjunction with the operating system 268 and/or an application 288 to provide a video chat experience.

Any or all of the audio input device 252, the text input device 254, the video input device 256, the display 258, and the audio output device 260 may be integrated with the client 250, or may be provided externally to the client 250 and connected to the client 250 in a wired or wireless manner. These devices may also be used to support a communications application, such as an application for making video calls or a social networking application.

An operating system 268 may support the client 250, and may coordinate and/or control the audio input device 250, the text input device 254, the video input device 256, the display 258, the audio output device 260, a memory 270, an application 288, and/or a network interface 276.

The memory 270 (e.g., RAM, ROM, etc.) may store data structures for use by the application 288 and/or the operating system 268.

For example, the memory 270 may store one or more captured images 272 from the video input device 256. The captured images 272 may be used by the application 288 as part of a video call, and/or may be separately scraped form the memory 270 in response to a request to capture an image of the video call interface.

The memory 270 may also store a set of cached graphical elements 274. The cached graphical elements 274 may be a subset of the graphical element library 284 stored on the server 280. The cached graphical elements 274 may include graphical elements configured to be applied to the captured interface. The cached graphical elements 274 may include those graphical elements most commonly applied by the user of the client 250 and/or the graphical elements the user is predicted to be interested in applying.

The client 250 may execute an application 288 capable of processing a video call and/or capturing a data structure representing the interface of the video call. These capabilities may also be split between multiple applications 288. The application 288 may be a special-purpose video call application, or may be a messaging, communication, social networking, or other type of application that incorporates video calling capabilities.

The application 288 may support video call logic 240 capable of processing, analyzing, facilitating, and displaying a video conversation. For example, the video call logic 240 may support, among other things, image processing logic 242 configured to accept a captured image 272 from the video input device 256 and to configure the captured image 272 for use in a video call. For example, the image processing logic 242 may encode or compress the captured image 272 to create a new image to be used as part of the video call. After being processed by the image processing logic, the new image may exhibit reduced resolution or quality as compared to the original captured image 272, which may continue to be stored in its original, higher-quality form in the memory 270.

The application 288 may further support interface capture logic 248 capable of capturing, rearranging, augmenting, or otherwise modifying an interface of the video call. For example, the interface capture logic 248 may support interface information capture logic configured to capture information about the interface in response to a request to capture an image of the interface (e.g., a request for a screenshot forwarded by the operating system 268). The captured information may include an image of the interface and/or metadata about the interface. The image of the interface may include images or descriptions of the background of the interface, any graphical and/or interactable elements present on the interface at the time the interface was captured, and may include one or more low-quality images of the various video feeds displayed in the interface. In some embodiments, the metadata associated with the interface may include a location and size of interface elements into which the respective video feeds are placed. Instead of the low-quality images of the video feeds, one or more icons or placeholder graphics may be placed into these locations. These icons or placeholder graphics may be replaced by high-quality images scraped from the memory 270 of the local device and any participant devices. As the high-quality images are moved on the interface, the icons or placeholder graphics may remain in the original place occupied by the high-quality image in order to represent the original location of these images. The interface information capture logic 250 may be configured to store the interface information in an interface structure, such as the structure depicted in FIG. 3.

The interface capture logic 248 may further support moveable element logic 252. The moveable element logic may be configured to generate and/or modify one or more moveable elements based on the high-quality image scraped from the memory 270. Each moveable element may include a copy of the image and related information, such as an original size and position of the video feed corresponding to the image in the interface. The moveable element logic 252 may be configured to store the data for the moveable element in a moveable element structure, such as the structure depicted in FIG. 3.

The interface capture logic 248 may further support repositioning logic 254 configured to move the moveable elements and any graphical elements added to the interface. In some embodiments, the layout of the interface may be constrained, so that moveable elements may be moved from one predefined location in the interface to another (potentially being swapped with other moveable elements present at the new location), but cannot be rearranged into a new configuration. In other embodiments, the layout may be unconstrained so that the moveable elements can be freely moved on the interface, or may be partially constrained so that the moveable elements can be moved to predetermined locations or to a predefined range of locations. In some embodiments, graphical elements in the interface may be freely moved, or may be tied to an associated moveable element so that they move with the moveable element. The repositioning logic 254 may be configured to modify a value of a position in an interface structure (see FIG. 3) associated with the moved moveable element and/or graphical element.

The interface capture logic 248 may further support graphical element logic 256 that allows graphical elements to be added or removed from the interface. The graphical elements may include pictures, icons, stickers, animated GIFs, etc. The graphical element logic may retrieve one or more graphical elements from the cached graphical elements 274 and/or the graphical element library 284 and present the retrieved graphical elements in an interface (e.g., a drawer) allowing them to be selected and placed in the video call interface. The graphical element logic 256 may be configured to add or alter a graphical element structure, as shown in FIG. 3.

Figure 3:
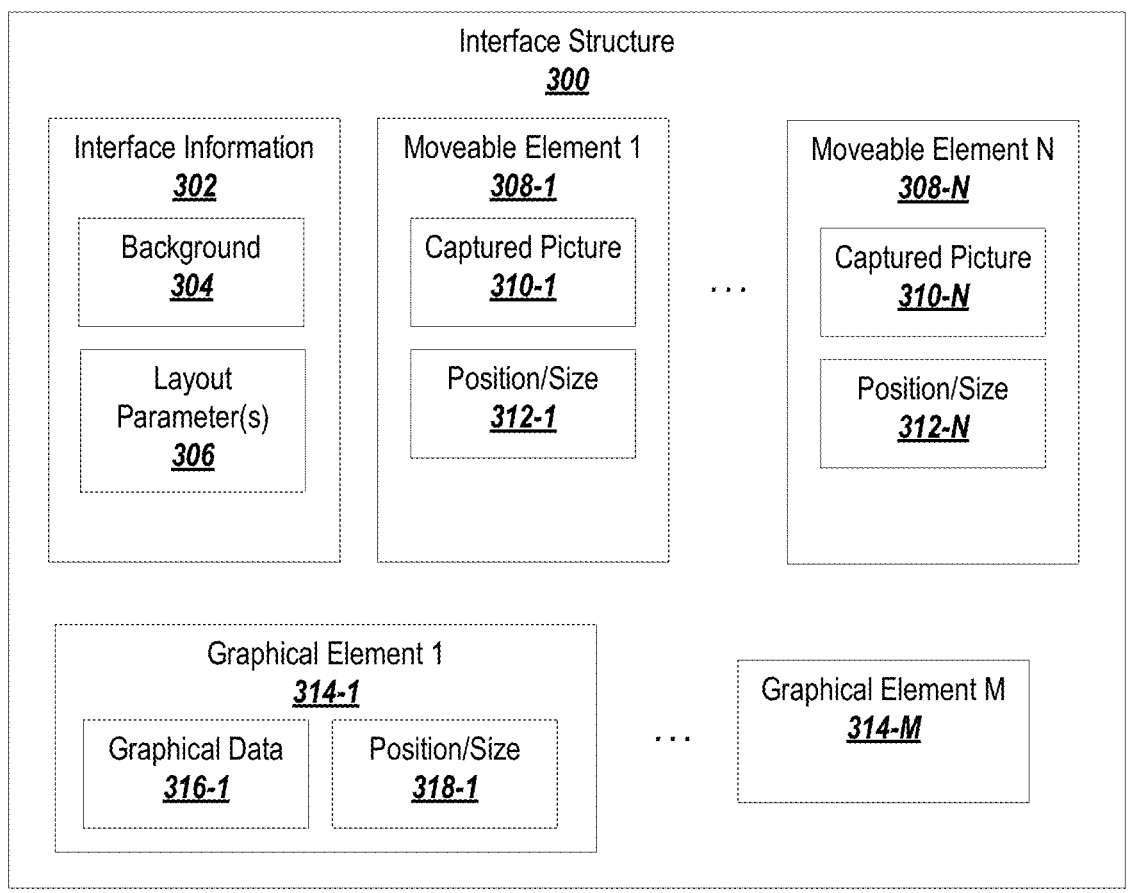
FIG. 3 depicts an exemplary data structure for an editable interface.

The interface capture logic 248 may further support parameter setting logic 258 configured to retrieve information from a social network of one or more participants in the video call, use the information to generate parameters that may constrain the position of one or more of the moveable elements and/or graphical elements, and store the parameters in the interface structure (see FIG. 3). The parameters may be predefined parameters and/or may be associated with tags or categories on any of the graphical elements added to the interface. For example, if the graphical element added to the interface is a birthday cake, the graphical element may be associated with a "birthday tag." In response to adding the graphical element to the interface, the parameter setting logic 258 may consult the social media profiles of the participants in the call to determine if any of them has a birthday today. If so, a parameter may be created that constrains the graphical element so that it is locked to the moveable element corresponding to the user having the birthday. Optionally, the constraints may be removed by a user editing the interface so that the graphical elements can be freely moved.

The application 238, memory 220, and I/O devices may communicate, through the operating system 218, with a network interface for communication on a network 228, such as the internet. The network interface 226 may be, for example, a network interface card (NIC) or other suitable hardware and/or software for managing network transmissions and receptions.

Figure 5:
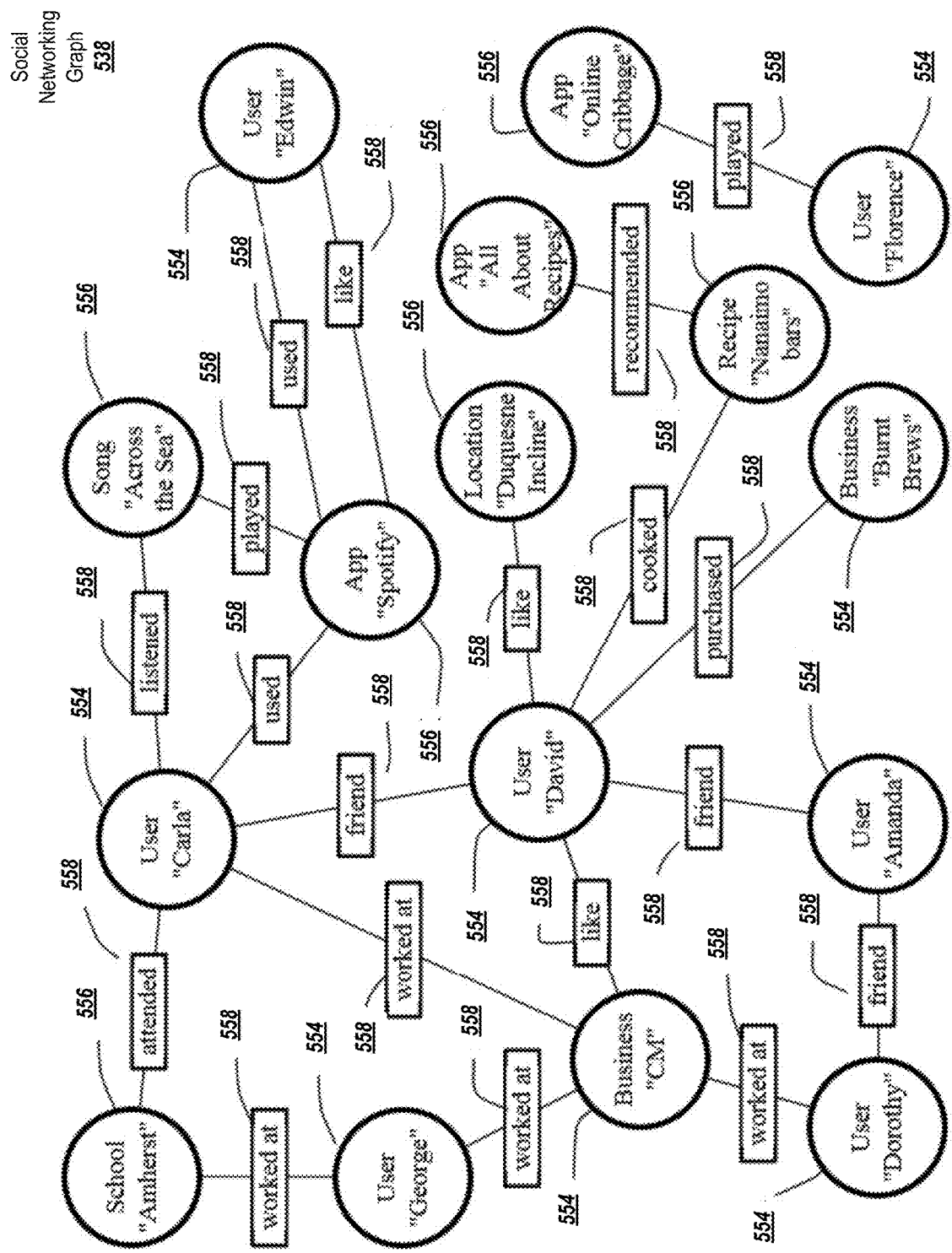
FIG. 5 depicts an exemplary social networking graph.

The client 200 may, through the network interface 226, communicate with a corresponding network interface 232 on a server 230. The server may provide support for the video call logic 240 and/or the interface capture logic 248. For example, the server 230 may store a graphical element library 234, which includes multiple graphical elements that may be added to the interface. The server 230 may also or alternatively store a social graph 538, as depicted in FIG. 5.

Any or all of the above-described logic may be executed via instructions on one or more hardware processors. The instructions may be stored on a physical non-transitory computer-readable storage medium. It is noted that, although the logic and data structures are depicted in a particular configuration in FIG. 2B (with some on the client 200 and others on the server 230), other configurations are also contemplated.

Data Structure

In some embodiments, the system may build a data structure representing the interface in response to a request to capture an image of the interface. FIG. 3 depicts an example of such a structure 300.

The interface structure 300 may include interface information, which describes any aspects of the interface that are not moveable elements 308-$i$ or graphical elements 314-$i$, but which otherwise form part of the interface that should be represented in order to accurately recreate the interface. The interface information may include, for example, a background 304. The background 304 may be an image of the interface's background, a description of the interface's background that allows the background to be recreated, etc.

The interface information 302 may further include layout parameters 306. The layout parameters may define an absolute or relative location of various elements in the interface in order to capture the general configuration of the interface. The layout parameters 306 may further define a size of the respective interface elements (e.g., the size of the preview window, the main window, the roster, the number of elements, etc.). In some embodiments, the elements of the interface may be constrained so that, although they can be rearranged, the elements must be rearranged into the same layout format. In these embodiments, any moved elements may be snapped to locations defined by the layout parameters. In other embodiments, the interface elements may be moved freely or constrained by a limited amount.

Optionally, the layout parameters 306 may include icons or default graphical content that may be displayed in place of the various video feeds. These icons or content may provide location information allowing the user to see, while moving a moveable element and/or graphical element, where the element originated and/or where any swapped elements will be moved to.

The layout parameters 306 may further include constraints on how certain elements must appear relative to each other. For example, the layout parameters 306 may define that a given graphical element 314-$i$ must be positioned in a particular way with respect to moveable element 308-$i$ that it appears near (e.g., an animation of balloons rising on the interface must initially appear over the upper-right corner of the moveable element 308-$i$). The layout parameters 306 might, alternatively or in addition, lock certain graphical elements 314-$i$ to certain moveable elements (e.g., a birthday crown must appear over the head of a particular participant, even if that participant's moveable element is moved to a new location).

In some embodiments, the layout parameters 306 may include an initial layout for the interface as viewed on the local device, and identifiers or other information allowing the layout as viewed from a different participants' device to be recreated (e.g., which user should appear in the preview window, which user should appear in the main window, the order of the participants on the roster, etc.). When editing the interface, an interactable element may be provided (e.g., including a drop-down list) allowing the user to immediately reconfigure the interface into a configuration as it would have been on the selected participant's device.

The interface structure 300 may further include one or more moveable elements 308-$i$. The moveable elements 308-$i$ may define assets or portions of the interface that may be moved from one location to another, or which may be swapped with each other. The moveable elements 308-$i$ may include a captured picture 310-$i$ that was scraped from the memory of the device associated with the video feed of the user associated with the captured picture 310-$i$. The moveable element 308-$i$ may further include a position and/or size 312-$i$ of the moveable element. The position and/or size 312-$i$ may be initialized to the original position of the video feed corresponding to the captured picture 310-$i$ in the captured interface, and may be updated as the moveable element 308-$i$ is moved to a new location in the interface.

The interface structure 300 may further include one or more graphical elements 314-$i$. The graphical elements 314-$i$ may include graphical additions to the interface, which may be added during the call and/or after, as the captured interface is modified. The graphical element 314-$i$ may include graphical data 314-$i$ that describes the graphic to be applied (e.g., an image, an icon, a sticker, an animated GIF, etc.) and a position/size 318-$i$ for the graphical element (initial and/or updated).

Next, techniques for generating and using the interface structure 300 are described.

Data Flow and Exemplary Methods

Figure 4A:
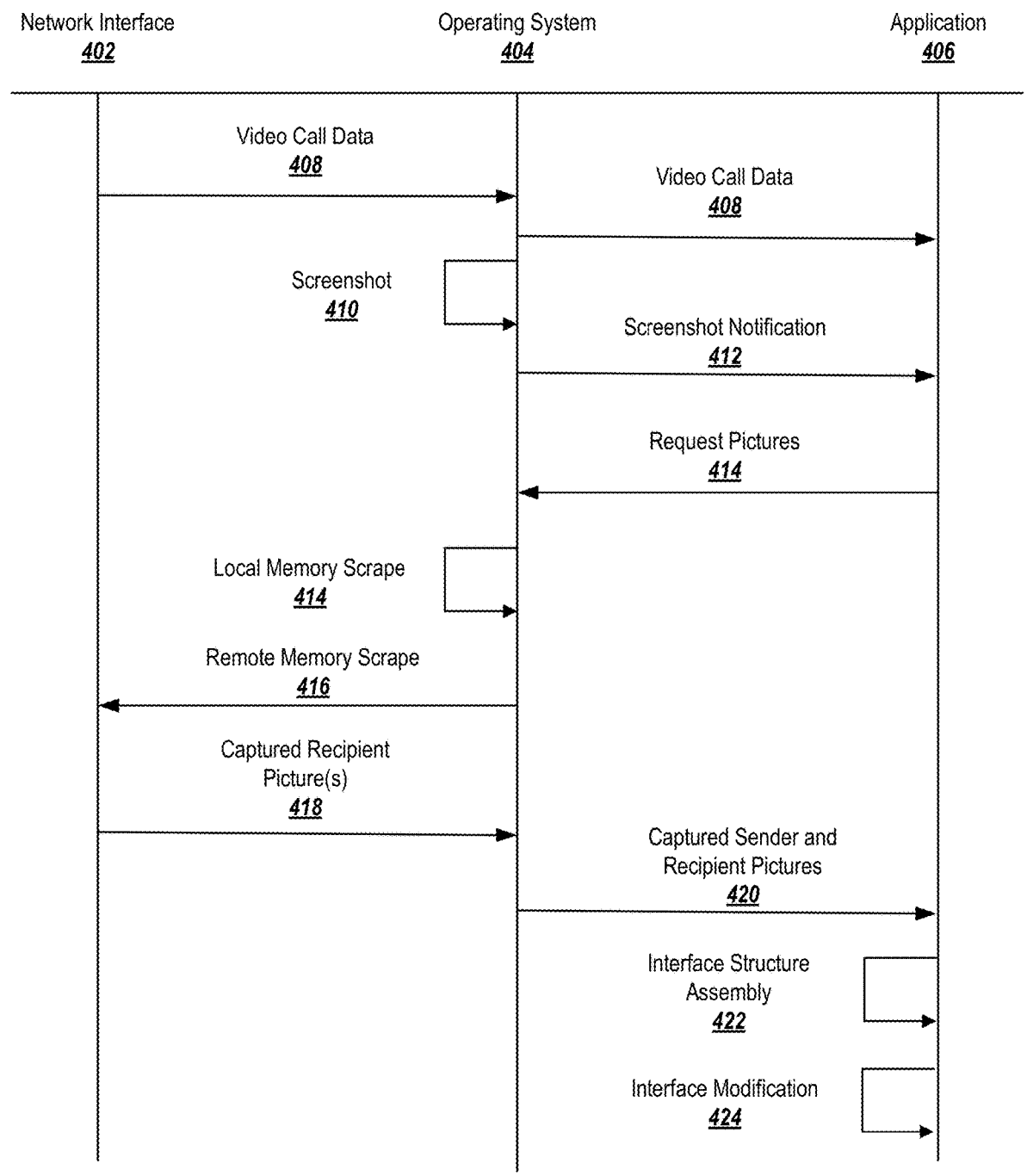
FIG. 4A is a data flow diagram depicting information exchange among elements of an exemplary environment.

FIG. 4A depicts an exemplary data flow diagram depicting information exchange among the network interface 402, the operating system 404, and an application 406 on a device, such as one of the devices depicted in FIG. 2A, in various video calling scenarios.

The device may participate in a video call. To that end, audio, video, and/or control data 408 may be received at the network interface 402 and passed to the operating system 404. The operating system 404 may recognize the video call data 408 as being associated with the application 406, and may therefore forward the data 408 to the application 406.

The operating system 404 may register a request 410 for a screenshot (e.g., in response to the user pressing a certain combination of buttons, triggering a keyboard command, etc.). The application 406 may pre-register with the operating system 404 to receive notifications of certain events, such as a screen shot capture event. In response to the request 410 for the screenshot, a notification 412 may be sent from the operating system to the application 406.

Upon receiving the notification 412 of a request for the screenshot, the application 406 may request 414 that the operating system 404 obtain local and/or remote high-quality images of the video feeds in the video call. Accordingly, the operating system 404 may scrape 414 the memory of the local device where the images from the device camera are stored. The operating system 404 may retrieve an image corresponding to the current state of the conversation from the memory; this image may be of higher quality than the compressed image used as part of the video feed. In response to receiving the screenshot notification 412, the application 406 may take initial steps to capture information relevant to the screenshot, such as information about the interface background, the initial position of respective video feeds, any graphical elements present in the interface at the time of capture, etc.

In some embodiments, the application 406 may capture an immediate image of the interface, which may include the low-quality images from the video feed. If any high-quality images are not received (e.g., due to network latency or another problem), the low-quality version of the images may be used in their place.

Similarly, the operating system 404 may transmit a request 416 to the network interface 402, requesting that the device of the other participants in the video call scrape their memory for a high-quality image of their video feed. The request 416 may be received at the corresponding application 406 at the recipient user devices, which may similarly request high-quality images corresponding to their video feeds from their respective operating systems 404.

If any of the applications 406 have direct access to the memory space in which the images captured by the camera are stored (or some other way of obtaining a high-quality version of the image), the applications 406 may directly obtain and/or exchange high-quality images, without going through the operating system 404.

The recipient devices may transmit their own high-quality images to the local device, and the images may be received at the network interface 402. The network interface may forward the captured recipient pictures 418 to the operating system 404, which may in turn transmit the received images and the image scraped from the local memory 420 to the application 406.

Upon receiving the requested images, the application 406 may assemble 422 an interface structure, similar to the one depicted in FIG. 3. The interface structure may be assembled 422 using the technique depicted in FIG. 4B. Subsequently, the user may modify 424 the interface using the technique described in FIG. 4C.

Figure 4B:
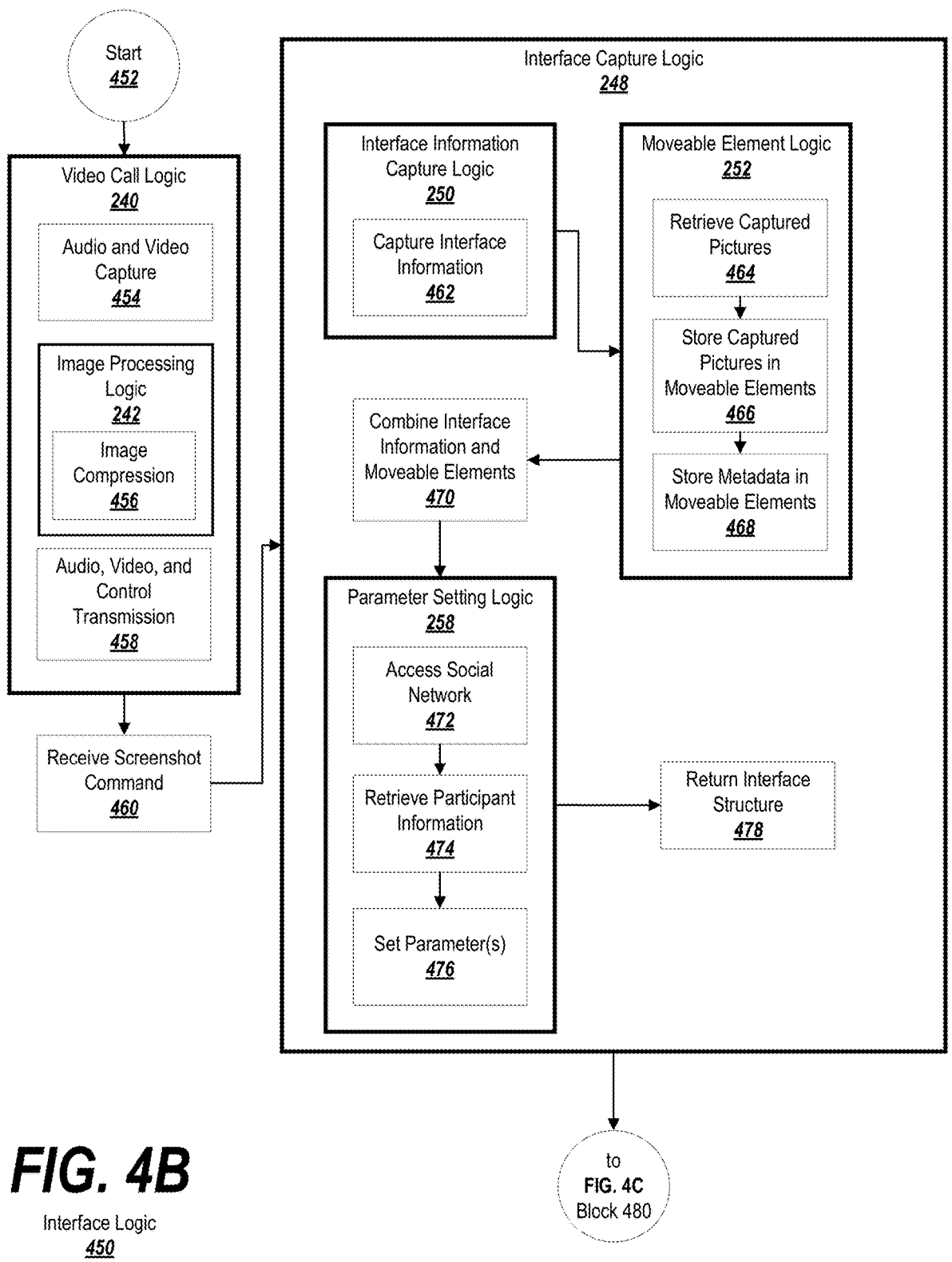
FIG. 4B-4C are flowcharts showing exemplary logic for capturing and editing an interface.
Figure 4C:
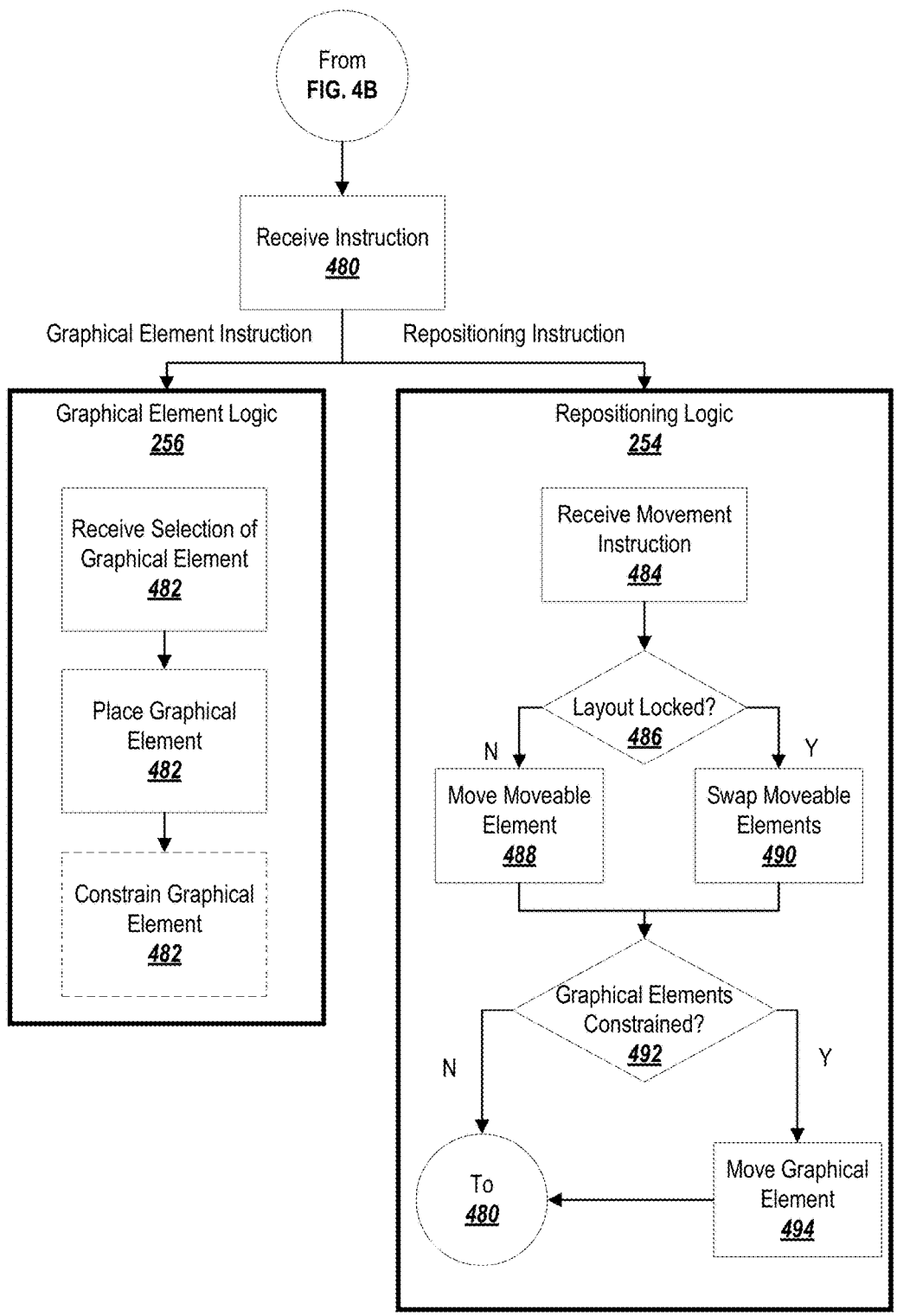

Next, exemplary logic 450 for capturing, rearranging, and otherwise modifying a video call interface are described in connection with FIGS. 4B-4C. FIGS. 4B-4C organize the logic blocks depicted into various groups of logics. In some embodiments, these logic modules may be provided on a client device, as shown in FIG. 2B, although it is understood that such a configuration is not required. All of the modules may be implemented in the same device, or may be distributed across any number of devices. Various combinations of modules may be employed on a given device, or the logic of an individual module may be performed by different devices.

Processing may begin at block 402, when a video call is commenced (or in progress). Processing may be handed off to the video call logic 240, which may capture audio and video for the video call at block 454. After capturing the audio and video, processing may be handed off to image processing logic 242, which prepares the images captured from the camera for transmission in the video. For instance, the image processing logic 242 may, at block 456, compress the image, lower its resolution, or otherwise reduce its size so that it is suitable for transmission as part of a video. In some embodiments, the camera may place a high-quality image in a memory of the device that is maintained separately from an image output by the image processing logic 242. In other embodiments, the image processing logic 242 may maintain a high-quality version of the image in the memory in parallel to the compressed version of the image output by the image processing logic 242. At block 458, the captured audio and processed image(s) may be transmitted, along with any video call control data, to one or more recipient devices.

At block 460, the system may receive a command to capture a screenshot (or otherwise image the interface). As noted above, the application may register with the operating system to receive notifications of such commands or instructions. In response to receiving the screenshot command, processing may be handed off to interface capture logic 248.

The interface capture logic 248 may first hand off processing to interface information capture logic 250, which may, at block 462, capture information associated with the interface. This may include an interface template, an image of the background of the interface, positioning information for elements of the interface, information allowing the interface to be reconstructed (e.g., a color of the background, any interactable elements present on the interface, etc.). Processing may then be handed off to moveable element logic 252.

The moveable element logic 252 may, at block 464, retrieve captured high-quality images to be added to moveable element structures. A first captured picture may originate at the local device, and may be scraped from the local device's memory. Any other participants in the call may also be requested to scrape their own memories, and to provide respective high-quality images corresponding to their own video feeds. After all captured pictures are received (and/or after it becomes apparent that high-quality pictures of some video feeds are unavailable), the moveable element logic 248 may store the captured pictures in moveable element data structures at block 466. In some embodiments, metadata may be associated with the images (e.g., a timestamp, an identity of a user device that captured the image, a location tag, a size of the image, a position of the image, etc.). At block 468, this metadata may also be added to the corresponding moveable element.

At block 470, the interface information captured at block 462 and the moveable elements assembled at blocks 466-468 may be combined and stored in an interface element. Processing may then be handed off to parameter setting logic 258.

At block 472, the parameter setting logic 258 may access social networking information associated with the participants in the call. In some embodiments, the parameter setting logic 258 may access only the publicly accessible information for the user accounts. If the parameter setting logic 258 has been provided with authorization to access other information (e.g., information that would otherwise be accessible to the local device), then this information may also be considered. At block 474, the parameter setting logic 258 may retrieve any relevant information about the participants. Relevant information may be predefined and/or may be selected based on any graphical elements present in the interface (e.g., which were originally a part of the video call, or which were subsequently added). For example, one of the graphical elements is a diploma, then at block 474 the parameter setting logic 258 may access the calendars of the participants to see if any of the participants is attending a graduation ceremony. If one of the graphical elements is a cake, the birthdays of the participants may be checked.

At block 476, one or more parameters may be set based on the participant information obtained at block 474. The parameters may constrain movement of the moveable or graphical elements, or may link a graphical element to a moveable element. The parameters may be added to the interface structure.

At block 478, the interface capture logic 248 may return the interface structure in response to the command received at block 460. Optionally, the interface structure may be used to recreate the interface at high quality and an image of the interface may be generated. This image may be returned to the operating system to be used as the screenshot. Processing may then proceed to block 480 (see FIG. 4C).

Having thus built the interface structure, the reconstructed interface may be presented to the user for editing. The user may provide an editing instruction at block 480.

In exemplary embodiments, the editing instruction may include an instruction to add or delete a graphical element, or to reposition a graphical or moveable element in the interface. For instance, an instruction to add or delete a graphical element may be received in response to the user selecting an interactable element on a display; the selection of the interactable element may cause a drawer to be displayed which includes graphical elements that may be added to the interface. In some embodiments, the graphical elements may be recommended, e.g., based on the information obtained from the social network at block 474. The repositioning instruction may be received in response to a user dragging a graphical or moveable element on the screen.

If the instruction is an instruction to add a graphical element, then processing may be handed off to graphical element logic 256. At block 482, the graphical element logic 256 may receive a selection of a graphical element to be added to the interface (e.g., via the aforementioned drawer). At block 482, the graphical element logic 256 may place the graphical element on the interface at a location designated by the user. Optionally, at block 482, the location at which the graphical element may be placed may be constrained based on the parameters set at block 476. This constraint may be overridden by the user. In some embodiments, if the graphical element is initially placed on or in close proximity to a moveable element, the graphical element may be locked to the moveable element so that it moves with the moveable element. This locking may be overridden by a user.

If the instruction received at block 480 is an instruction to reposition a graphical or moveable element of the interface, processing may be handed off to repositioning logic 254. The repositioning logic 254 may, at block 484, receive the movement instruction. For example, the movement instruction may consist of the user selecting the element to be moved at a first location, and dragging the element to a second location. The movement instruction may also or alternatively be an instruction to resize the element (such as by selecting and dragging an anchor point on the element).

At block 486, the repositioning logic 254 may determine if the layout has been locked to a particular configuration. The layout may be locked by default, although this locking may be overridden. In some embodiments, a user may manually lock the layout, or the layout may be locked as a result of settings in the video call.

If the layout is locked the moveable elements may still be repositioned, but the resulting configuration must be the same as the original layout. Accordingly, at block 490, the system may determine a moveable element to swap with the element being moved. For instance, if the user drags the moved element over another element (or in close proximity to another element), then the moved element's location and size may be swapped with the other element.

If the layout is not locked, then the moveable elements may be rearranged freely. Accordingly, at block 488, the moveable element may be moved from its original location to the new location indicated by the user.

Next, processing proceeds to block 492, where the repositioning logic determines if the size and/or position of any graphical elements are implicated by the movement of the element that was repositioned and/or resized at blocks 488-490. For example, a graphical element may be associated with or locked to a given moveable element, so that the graphical element is resized and/or moved along with the moveable element. The constraints may be defined by the parameters in the interface structure. If any graphical element is so constrained, then at block 494 the graphical element may be moved or resized based on the movement and/or resizing of the associated moveable element. After the determination is made and acted upon, processing may then revert to block 480, where the system awaits further instructions with respect to the interface.

One constructed and/or modified, the interface structure may be used to reconstruct the interface and may be used as desired. For example, the elements of the interface may be moved or resized, the interface may be cropped around a high-quality version of the image from the video feed, the interface may be posted to a social networking post, story, update, etc., or any other suitable action may be taken with respect to the interface.

Communication System Overview

These examples may be implemented by a communications system that is provided either locally, at a client device, or remotely (e.g., at a remote server). In some embodiments, the communications system may be part of a social networking environment.

FIG. 5 illustrates an example of a social networking graph 538. In exemplary embodiments, a social networking service may store one or more social graphs 538 in one or more data stores as a social graph data structure via the social networking service.

The social graph 538 may include multiple nodes, such as user nodes 554 and concept nodes 556. The social graph 228 may furthermore include edges 558 connecting the nodes. The nodes and edges of social graph 228 may be stored as data objects, for example, in a data store (such as a social-graph database). Such a data store may include one or more searchable or queryable indexes of nodes or edges of social graph 228.

The social graph 538 may be accessed by a social-networking server 226, client system 210, third-party system (e.g., the translation server 224), or any other approved system or device for suitable applications.

A user node 554 may correspond to a user of the social-networking system. A user may be an individual (human user), an entity (e.g., an enterprise, business, or third-party application), or a group (e.g., of individuals or entities) that interacts or communicates with or over the social-networking system. In exemplary embodiments, when a user registers for an account with the social-networking system, the social-networking system may create a user node 554 corresponding to the user, and store the user node 30 in one or more data stores. Users and user nodes 554 described herein may, where appropriate, refer to registered users and user nodes 554 associated with registered users. In addition or as an alternative, users and user nodes 554 described herein may, where appropriate, refer to users that have not registered with the social-networking system. In particular embodiments, a user node 554 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 554 may be associated with one or more data objects corresponding to information associated with a user. In particular embodiments, a user node 554 may correspond to one or more webpages. A user node 554 may be associated with a unique user identifier for the user in the social-networking system.

In particular embodiments, a concept node 556 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 556 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 556 may be associated with one or more data objects corresponding to information associated with concept node 556. In particular embodiments, a concept node 556 may correspond to one or more webpages.

In particular embodiments, a node in social graph 538 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 556. Profile pages may be viewable by all or a selected subset of other users. As an example and not by way of limitation, a user node 554 may have a corresponding user-profile page in which the corresponding user may add content, make declarations, or otherwise express himself or herself. A business page such as business page 205 may comprise a user-profile page for a commerce entity. As another example and not by way of limitation, a concept node 556 may have a corresponding concept-profile page in which one or more users may add content, make declarations, or express themselves, particularly in relation to the concept corresponding to concept node 556.

In particular embodiments, a concept node 556 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 554 corresponding to the user and a concept node 556 corresponding to the third-party webpage or resource and store edge 558 in one or more data stores.

In particular embodiments, a pair of nodes in social graph 538 may be connected to each other by one or more edges 558. An edge 558 connecting a pair of nodes may represent a relationship between the pair of nodes. In particular embodiments, an edge 558 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 558 connecting the first user's user node 554 to the second user's user node 554 in social graph 538 and store edge 558 as social-graph information in one or more data stores. In the example of FIG. 5C, social graph 538 includes an edge 558 indicating a friend relation between user nodes 554 of user "Amanda" and user "Dorothy." Although this disclosure describes or illustrates particular edges 558 with particular attributes connecting particular user nodes 554, this disclosure contemplates any suitable edges 558 with any suitable attributes connecting user nodes 554. As an example and not by way of limitation, an edge 558 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 538 by one or more edges 558.

In particular embodiments, an edge 558 between a user node 554 and a concept node 556 may represent a particular action or activity performed by a user associated with user node 554 toward a concept associated with a concept node 556. As an example and not by way of limitation, as illustrated in FIG. 5C, a user may "like," "attended," "played," "listened," "cooked," "worked at," or "watched" a concept, each of which may correspond to a edge type or subtype. A concept-profile page corresponding to a concept node 556 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking system may create a "listened" edge 558 and a "used" edge (as illustrated in FIG. 5C) between user nodes 554 corresponding to the user and concept nodes 556 corresponding to the song and application to indicate that the user listened to the song and used the application. Moreover, the social-networking system may create a "played" edge 558 (as illustrated in FIG. 5C) between concept nodes 556 corresponding to the song and the application to indicate that the particular song was played by the particular application. In this case, "played" edge 558 corresponds to an action performed by an external application (SPOTIFY) on an external audio file (the song "Across the Sea"). Although this disclosure describes particular edges 558 with particular attributes connecting user nodes 554 and concept nodes 556, this disclosure contemplates any suitable edges 558 with any suitable attributes connecting user nodes 554 and concept nodes 556. Moreover, although this disclosure describes edges between a user node 554 and a concept node 556 representing a single relationship, this disclosure contemplates edges between a user node 554 and a concept node 556 representing one or more relationships. As an example and not by way of limitation, an edge 558 may represent both that a user likes and has used at a particular concept. Alternatively, another edge 558 may represent each type of relationship (or multiples of a single relationship) between a user node 554 and a concept node 556 (as illustrated in FIG. 5C between user node 554 for user "Edwin" and concept node 556 for "SPOTIFY").

In particular embodiments, the social-networking system may create an edge 558 between a user node 554 and a concept node 556 in social graph 538. As an example and not by way of limitation, a user viewing a concept-profile page (such as, for example, by using a web browser or a special-purpose application hosted by the user's client system) may indicate that he or she likes the concept represented by the concept node 556 by clicking or selecting a "Like" icon, which may cause the user's client system to send to the social-networking system a message indicating the user's liking of the concept associated with the concept-profile page. In response to the message, the social-networking system may create an edge 558 between user node 554 associated with the user and concept node 556, as illustrated by "like" edge 558 between the user and concept node 556. In particular embodiments, the social-networking system may store an edge 558 in one or more data stores. In particular embodiments, an edge 558 may be automatically formed by the social-networking system in response to a particular user action. As an example and not by way of limitation, if a first user uploads a picture, watches a movie, or listens to a song, an edge 558 may be formed between user node 554 corresponding to the first user and concept nodes 556 corresponding to those concepts. Although this disclosure describes forming particular edges 558 in particular manners, this disclosure contemplates forming any suitable edges 558 in any suitable manner.

The social graph 538 may further comprise a plurality of product nodes. Product nodes may represent particular products that may be associated with a particular business. A business may provide a product catalog to a consumer-to-business service and the consumer-to-business service may therefore represent each of the products within the product in the social graph 538 with each product being in a distinct product node. A product node may comprise information relating to the product, such as pricing information, descriptive information, manufacturer information, availability information, and other relevant information. For example, each of the items on a menu for a restaurant may be represented within the social graph 538 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 538. The information for a product node may be manipulated by the social-networking system as a product object that encapsulates information regarding the referenced product.

As such, the social graph 538 may be used to infer shared interests, shared experiences, or other shared or common attributes of two or more users of a social-networking system. For instance, two or more users each having an edge to a common business, product, media item, institution, or other entity represented in the social graph 538 may indicate a shared relationship with that entity, which may be used to suggest customization of a use of a social-networking system, including a messaging system, for one or more users.

The embodiments described above may be performed by a messaging architecture, an example of which is next described with reference to FIG. 6.

Messaging Architecture

Figure 6:
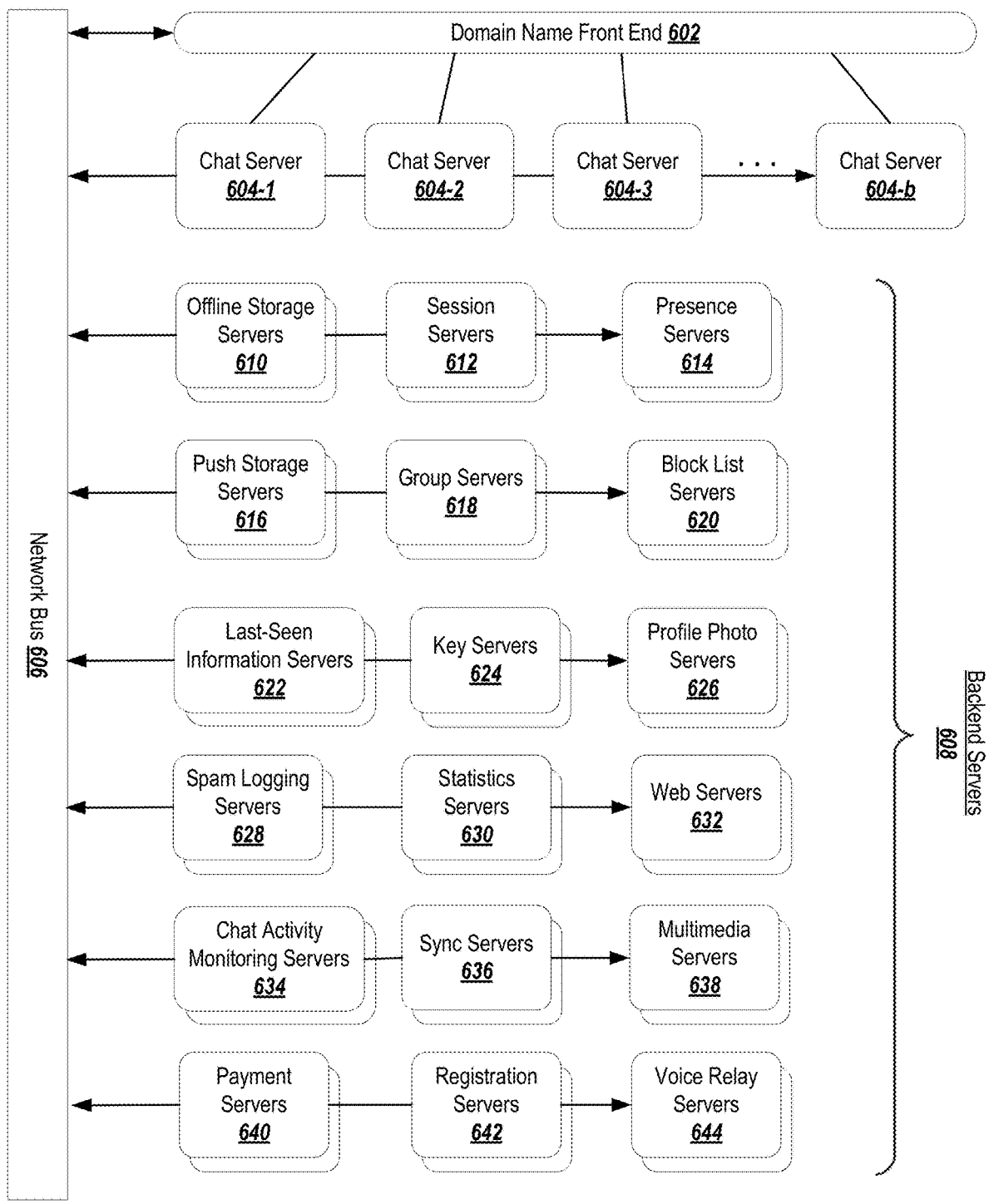
FIG. 6 is a block diagram depicting an example of a system for a messaging service.

FIG. 6 illustrates an embodiment of a plurality of servers implementing various functions of a messaging service 600. It will be appreciated that different distributions of work and functions may be used in various embodiments of a messaging service 600.

The messaging service 600 may comprise a domain name front end 602. The domain name front end 602 may be assigned one or more domain names associated with the messaging service 600 in a domain name system (DNS). The domain name front end 602 may receive incoming connections and distribute the connections to servers providing various messaging services.

The messaging service 602 may comprise one or more chat servers 604. The chat servers 604 may comprise front-end servers for receiving and transmitting user-to-user messaging updates such as chat messages. Incoming connections may be assigned to the chat servers 604 by the domain name front end 602 based on workload balancing.

The messaging service 600 may comprise backend servers 608. The backend servers 608 may perform specialized tasks in the support of the chat operations of the front-end chat servers 604. A plurality of different types of backend servers 608 may be used. It will be appreciated that the assignment of types of tasks to different backend serves 608 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging service 600 may comprise one or more offline storage servers 610. The one or more offline storage servers 610 may store messaging content for currently-offline messaging clients in hold for when the messaging clients reconnect.

The messaging service 600 may comprise one or more sessions servers 612. The one or more session servers 612 may maintain session state of connected messaging clients.

The messaging service 600 may comprise one or more presence servers 614. The one or more presence servers 614 may maintain presence information for the messaging service 600. Presence information may correspond to user-specific information indicating whether or not a given user has an online messaging client and is available for chatting, has an online messaging client but is currently away from it, does not have an online messaging client, and any other presence state.

The messaging service 600 may comprise one or more push storage servers 616. The one or more push storage servers 616 may cache push requests and transmit the push requests to messaging clients. Push requests may be used to wake messaging clients, to notify messaging clients that a messaging update is available, and to otherwise perform server-side-driven interactions with messaging clients.

The messaging service 600 may comprise one or more group servers 618. The one or more group servers 618 may maintain lists of groups, add users to groups, remove users from groups, and perform the reception, caching, and forwarding of group chat messages.

The messaging service 600 may comprise one or more block list servers 620. The one or more block list servers 620 may maintain user-specific block lists, the user-specific incoming-block lists indicating for each user the one or more other users that are forbidden from transmitting messages to that user. Alternatively or additionally, the one or more block list servers 620 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging service 600 may comprise one or more last seen information servers 622. The one or more last seen information servers 622 may receive, store, and maintain information indicating the last seen location, status, messaging client, and other elements of a user's last seen connection to the messaging service 600.

The messaging service 600 may comprise one or more key servers 624. The one or more key servers may host public keys for public/private key encrypted communication.

The messaging service 600 may comprise one or more profile photo servers 626. The one or more profile photo servers 626 may store and make available for retrieval profile photos for the plurality of users of the messaging service 600.

The messaging service 600 may comprise one or more spam logging servers 628. The one or more spam logging servers 628 may log known and suspected spam (e.g., unwanted messages, particularly those of a promotional nature). The one or more spam logging servers 628 may be operative to analyze messages to determine whether they are spam and to perform punitive measures, in some embodiments, against suspected spammers (users that send spam messages).

The messaging service 600 may comprise one or more statistics servers 630. The one or more statistics servers may compile and store statistics information related to the operation of the messaging service 600 and the behavior of the users of the messaging service 600.

The messaging service 600 may comprise one or more web servers 632. The one or more web servers 632 may engage in hypertext transport protocol (HTTP) and hypertext transport protocol secure (HTTPS) connections with web browsers.

The messaging service 600 may comprise one or more chat activity monitoring servers 634. The one or more chat activity monitoring servers 634 may monitor the chats of users to determine unauthorized or discouraged behavior by the users of the messaging service 600. The one or more chat activity monitoring servers 634 may work in cooperation with the spam logging servers 628 and block list servers 620, with the one or more chat activity monitoring servers 634 identifying spam or other discouraged behavior and providing spam information to the spam logging servers 628 and blocking information, where appropriate to the block list servers 620.

The messaging service 600 may comprise one or more sync servers 636. The one or more sync servers 636 may sync the messaging system 500 with contact information from a messaging client, such as an address book on a mobile phone, to determine contacts for a user in the messaging service 600.

The messaging service 600 may comprise one or more multimedia servers 638. The one or more multimedia servers may store multimedia (e.g., images, video, audio) in transit between messaging clients, multimedia cached for offline endpoints, and may perform transcoding of multimedia.

The messaging service 600 may comprise one or more payment servers 640. The one or more payment servers 640 may process payments from users. The one or more payment servers 640 may connect to external third-party servers for the performance of payments.

The messaging service 600 may comprise one or more registration servers 642. The one or more registration servers 642 may register new users of the messaging service 600.

The messaging service 600 may comprise one or more voice relay servers 644. The one or more voice relay servers 644 may relay voice-over-internet-protocol (VoIP) voice communication between messaging clients for the performance of VoIP calls.

Figure 7:
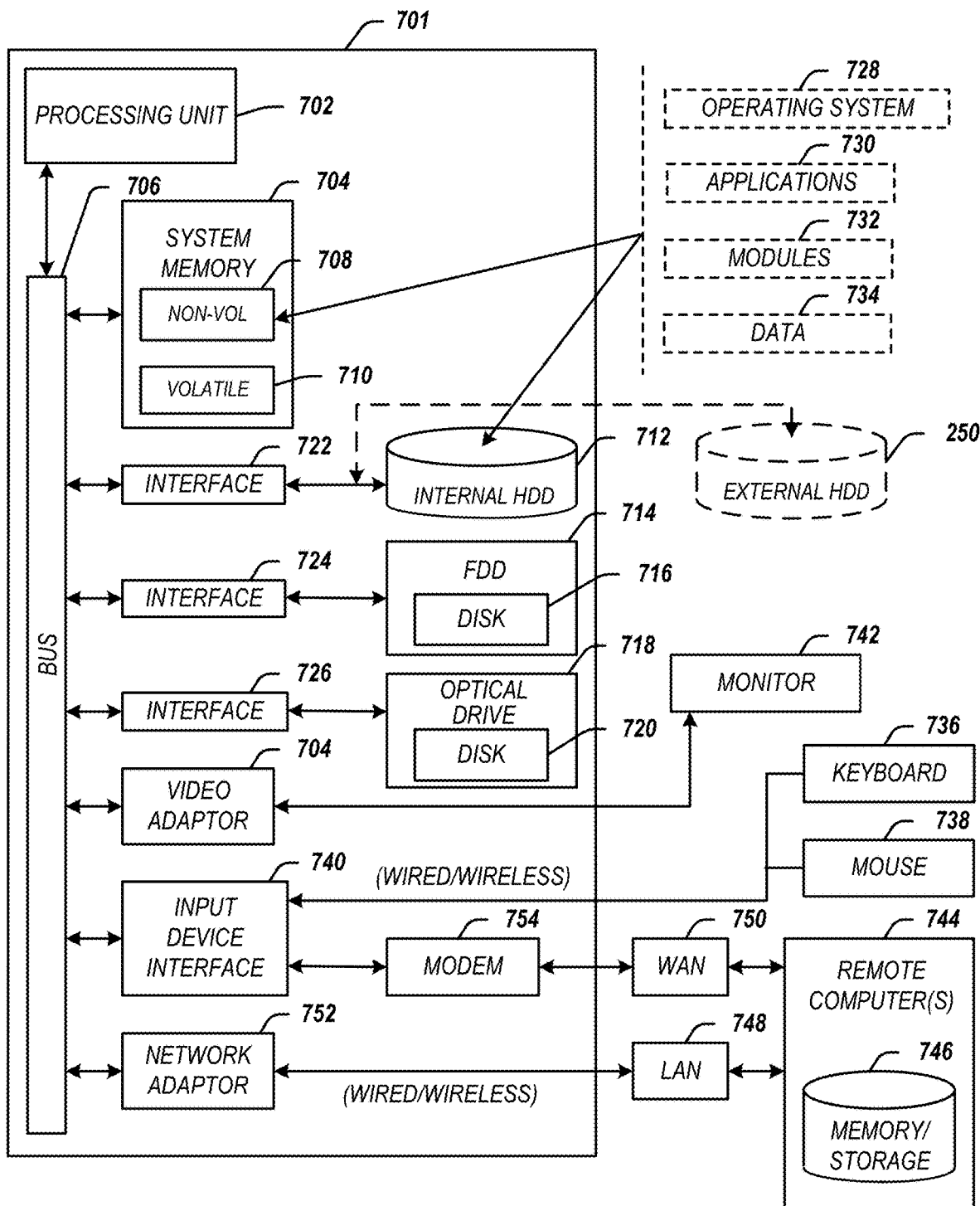
FIG. 7 is a block diagram illustrating an exemplary computing device suitable for use with exemplary embodiments.

The above-described methods may be embodied as instructions on a computer readable medium or as part of a computing architecture. FIG. 7 illustrates an embodiment of an exemplary computing architecture 700 suitable for implementing various embodiments as previously described. In one embodiment, the computing architecture 700 may comprise or be implemented as part of an electronic device, such as a computer 701. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 702, a system memory 704 and a system bus 706. The processing unit 702 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 702.

The system bus 706 provides an interface for system components including, but not limited to, the system memory 704 to the processing unit 702. The system bus 706 can be any of several types of bus structure that may further interconnect to a memory bus (with or without a memory controller), a peripheral bus, and a local bus using any of a variety of commercially available bus architectures. Interface adapters may connect to the system bus 706 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 704 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 704 can include non-volatile memory 708 and/or volatile memory 710. A basic input/output system (BIOS) can be stored in the non-volatile memory 708.

The computing architecture 700 may include various types of computer-readable storage media in the form of one or more lower speed memory units, including an internal (or external) hard disk drive (HDD) 712, a magnetic floppy disk drive (FDD) 714 to read from or write to a removable magnetic disk 716, and an optical disk drive 718 to read from or write to a removable optical disk 720 (e.g., a CD-ROM or DVD). The HDD 712, FDD 714 and optical disk drive 720 can be connected to the system bus 706 by an HDD interface 722, an FDD interface 724 and an optical drive interface 726, respectively. The HDD interface 722 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 708, 712, including an operating system 728, one or more application programs 730, other program modules 732, and program data 734. In one embodiment, the one or more application programs 730, other program modules 732, and program data 734 can include, for example, the various applications and/or components of the messaging system 500.

A user can enter commands and information into the computer 701 through one or more wire/wireless input devices, for example, a keyboard 736 and a pointing device, such as a mouse 738. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 702 through an input device interface 740 that is coupled to the system bus 706, but can be connected by other interfaces such as a parallel port, IEEE 694 serial port, a game port, a USB port, an IR interface, and so forth.

A monitor 742 or other type of display device is also connected to the system bus 706 via an interface, such as a video adaptor 744. The monitor 742 may be internal or external to the computer 701. In addition to the monitor 742, a computer typically includes other peripheral output devices, such as speakers, printers, and so forth.

The computer 701 may operate in a networked environment using logical connections via wire and/or wireless communications to one or more remote computers, such as a remote computer 744. The remote computer 744 can be a workstation, a server computer, a router, a personal computer, portable computer, microprocessor-based entertainment appliance, a peer device or other common network node, and typically includes many or all of the elements described relative to the computer 701, although, for purposes of brevity, only a memory/storage device 746 is illustrated. The logical connections depicted include wire/wireless connectivity to a local area network (LAN) 748 and/or larger networks, for example, a wide area network (WAN) 750. Such LAN and WAN networking environments are commonplace in offices and companies, and facilitate enterprise-wide computer networks, such as intranets, all of which may connect to a global communications network, for example, the Internet.

When used in a LAN networking environment, the computer 701 is connected to the LAN 748 through a wire and/or wireless communication network interface or adaptor 752. The adaptor 752 can facilitate wire and/or wireless communications to the LAN 748, which may also include a wireless access point disposed thereon for communicating with the wireless functionality of the adaptor 752.

When used in a WAN networking environment, the computer 701 can include a modem 754, or is connected to a communications server on the WAN 750, or has other means for establishing communications over the WAN 750, such as by way of the Internet. The modem 754, which can be internal or external and a wire and/or wireless device, connects to the system bus 706 via the input device interface 740. In a networked environment, program modules depicted relative to the computer 701, or portions thereof, can be stored in the remote memory/storage device 746. It will be appreciated that the network connections shown are exemplary and other means of establishing a communications link between the computers can be used.

The computer 701 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
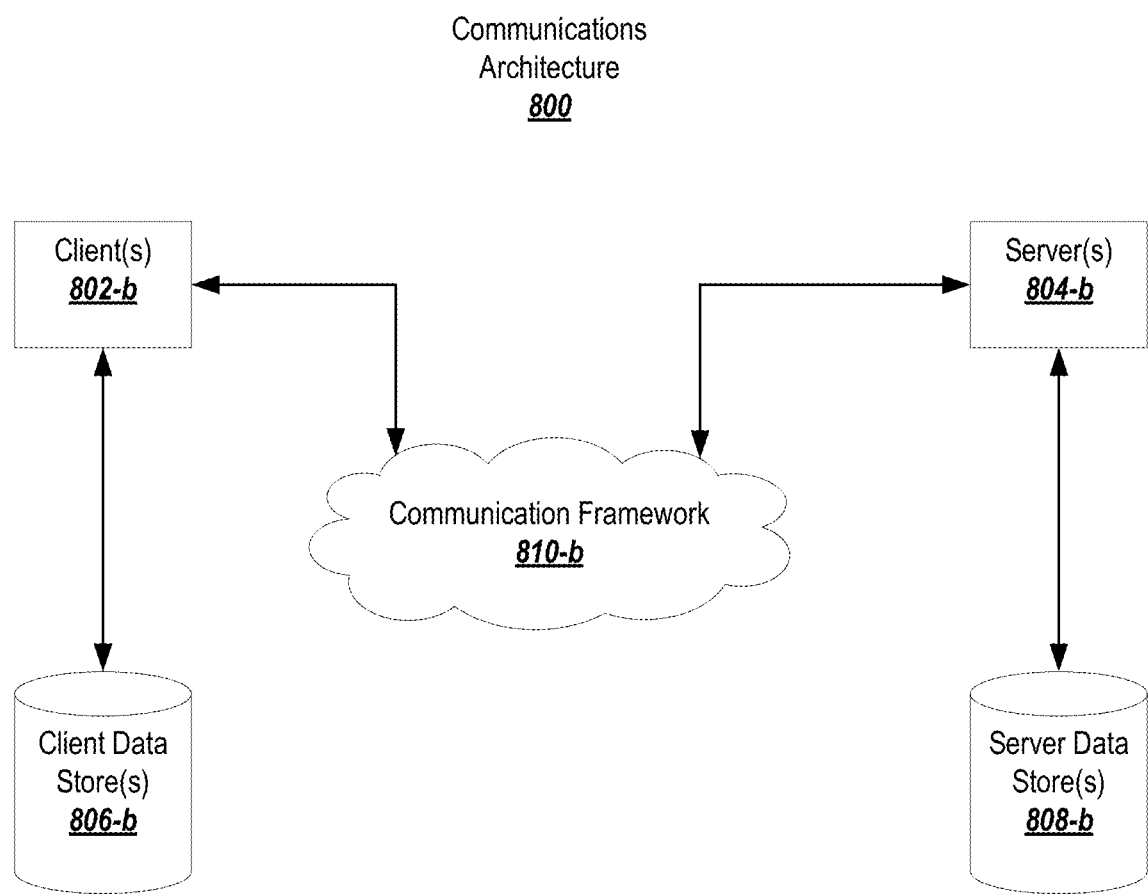
FIG. 8 depicts an exemplary communication architecture.

FIG. 8 is a block diagram depicting an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802 and servers 804. The clients 802 may implement the client device 510. The servers 804 may implement the server device 526. The clients 802 and the servers 804 are operatively connected to one or more respective client data stores 806 and server data stores 808 that can be employed to store information local to the respective clients 802 and servers 804, such as cookies and/or associated contextual information.

The clients 802 and the servers 804 may communicate information between each other using a communication framework 810. The communications framework 810 may implement any well-known communications techniques and protocols. The communications framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.8a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 9:
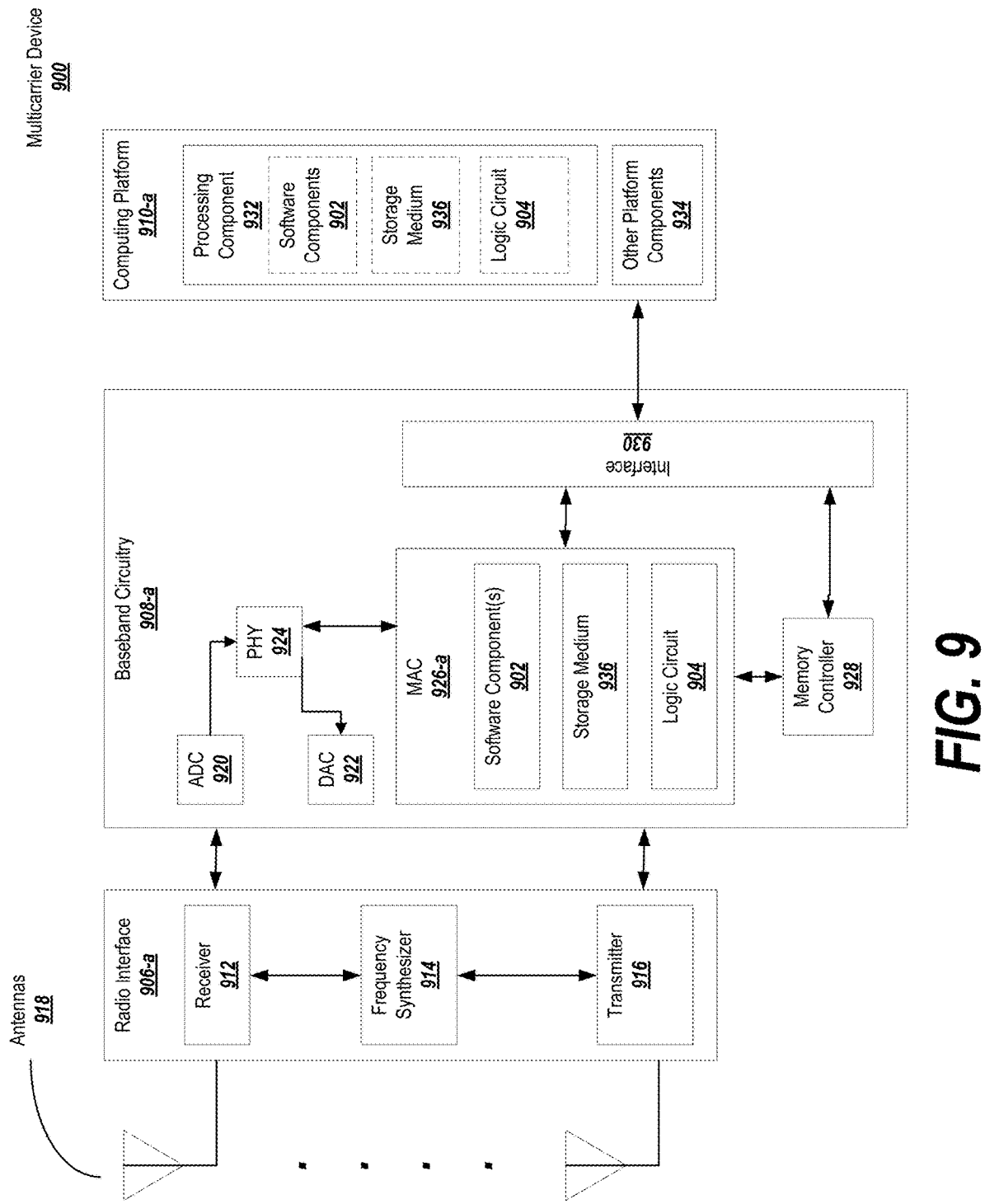
FIG. 9 is a block diagram depicting an exemplary multicarrier communications device.

FIG. 9 illustrates an embodiment of a device 900 for use in a multicarrier OFDM system, such as the messaging system 500. The device 900 may implement, for example, software components 902 as described with reference to the messaging component logic 600, the intent determination logic 700, and the group selection logic 800. The device 900 may also implement a logic circuit 904. The logic circuit 904 may include physical circuits to perform operations described for the messaging system 600. As shown in FIG. 9, device 900 may include a radio interface 906, baseband circuitry 908, and a computing platform 910, although embodiments are not limited to this configuration.

The device 900 may implement some or all of the structure and/or operations for the messaging system 500 and/or logic circuit 904 in a single computing entity, such as entirely within a single device. Alternatively, the device 900 may distribute portions of the structure and/or operations for the messaging system 600 and/or logic circuit 904 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, the radio interface 906 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. The radio interface 906 may include, for example, a receiver 912, a transmitter 914 and/or a frequency synthesizer 916. The radio interface 906 may include bias controls, a crystal oscillator and/or one or more antennas 918. In another embodiment, the radio interface 906 may use external voltage-controlled oscillators (VCOs), surface acoustic wave filters, intermediate frequency (IF) filters and/or RF filters, as desired. Due to the variety of potential RF interface designs an expansive description thereof is omitted.

The baseband circuitry 908 may communicate with the radio interface 906 to process receive and/or transmit signals and may include, for example, an analog-to-digital converter 920 for down converting received signals, and a digital-to-analog converter 922 for up-converting signals for transmission. Further, the baseband circuitry 908 may include a baseband or physical layer (PHY) processing circuit 924 for PHY link layer processing of respective receive/transmit signals. The baseband circuitry 908 may include, for example, a processing circuit 926 for medium access control (MAC)/data link layer processing. The baseband circuitry 908 may include a memory controller 928 for communicating with the processing circuit 926 and/or a computing platform 910, for example, via one or more interfaces 930.

In some embodiments, the PHY processing circuit 924 may include a frame construction and/or detection module, in combination with additional circuitry such as a buffer memory, to construct and/or deconstruct communication frames, such as radio frames. Alternatively or in addition, the MAC processing circuit 926 may share processing for certain of these functions or perform these processes independent of the PHY processing circuit 924. In some embodiments, MAC and PHY processing may be integrated into a single circuit.

The computing platform 910 may provide computing functionality for the device 900. As shown, the computing platform 910 may include a processing component 932. In addition to, or alternatively of, the baseband circuitry 908, the device 900 may execute processing operations or logic for the messaging system 500 and logic circuit 904 using the processing component 932. The processing component 932 (and/or the PHY 924 and/or MAC 926) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 910 may further include other platform components 934. Other platform components 934 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

The device 900 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of the device 900 described herein, may be included or omitted in various embodiments of the device 900, as suitably desired. In some embodiments, the device 900 may be configured to be compatible with protocols and frequencies associated one or more of the 3GPP LTE Specifications and/or IEEE 1402.16 Standards for WMANs, and/or other broadband wireless networks, cited herein, although the embodiments are not limited in this respect.

Embodiments of device 900 may be implemented using single input single output (SISO) architectures. However, certain implementations may include multiple antennas (e.g., antennas 918) for transmission and/or reception using adaptive antenna techniques for beamforming or spatial division multiple access (SDMA) and/or using MIMO communication techniques.

The components and features of the device 900 may be implemented using any combination of discrete circuitry, application specific integrated circuits (ASICs), logic gates and/or single chip architectures. Further, the features of the device 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary device 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium 936 may include instructions that, when executed, cause a system to perform any of the computer-implemented methods described herein.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method, comprising:
capturing a picture using a camera of a device;
storing the captured picture in a memory of the device;
transmitting the captured picture as part of a video call;
receiving an instruction to capture an image of an interface of the video call;
capturing information describing the interface;
retrieving the captured picture in the memory of the device;
storing the captured picture as a moveable graphical element in an interface structure with the information describing the interface; and
responding to the instruction with the interface structure.

2. The method of claim 1, wherein the moveable element is a first moveable element, and further comprising:
positioning the first moveable element at a first position on the image of the interface and positioning a second moveable element at a second position on the image of the interface;
receiving an instruction to move the first moveable element to the second position; and
rearranging the first moveable element and the second moveable element while maintaining a same layout of the image of the interface.

3. The method of claim 1, wherein the moveable element is a first moveable element, and further comprising:
positioning the first moveable element at a first position on the image of the interface and positioning a second moveable element at a second position on the image of the interface;
receiving an instruction to move the first moveable element to a third position distinct from the first and second positions; and
moving the first moveable element to create a different layout of the image of the interface.

4. The method of claim 1, further comprising:
after capturing the image of the interface, receiving an instruction to move the moveable element to a new position; and
updating the image of the interface with the movable element at the new position.

5. The method of claim 1, further comprising adding a new graphical element to the image of the interface.

6. The method of claim 1, wherein a layout of the image of the interface is at least partially defined by a layout parameter, and further comprising:
accessing information from a social networking account for at least one of the participants in the video call; and
using the accessed information to set the layout parameter.

7. The method of claim 1, wherein transmitting the captured picture as part of the video call comprises reducing a quality of the picture, and the captured picture stored in the moveable graphical element is of a higher quality than the transmitted captured picture.

8. A non-transitory computer-readable medium storing instructions configured to cause a hardware processor to:
capture a picture using a camera of a device;
store the captured picture in a memory of the device;
transmit the captured picture as part of a video call;
receive an instruction to capture an image of an interface of the video call;
capture information describing the interface;
retrieve the captured picture in the memory of the device;
store the captured picture as a moveable graphical element in an interface structure with the information describing the interface; and
respond to the instruction with the interface structure.

9. The medium of claim 8, wherein the moveable element is a first moveable element, and further storing instructions configured to cause the processor to:
position the first moveable element at a first position on the image of the interface and positioning a second moveable element at a second position on the image of the interface;
receive an instruction to move the first moveable element to the second position; and
rearrange the first moveable element and the second moveable element while maintaining a same layout of the image of the interface.

10. The medium of claim 8, wherein the moveable element is a first moveable element, and further storing instructions configured to cause the processor to:
position the first moveable element at a first position on the image of the interface and positioning a second moveable element at a second position on the image of the interface;
receive an instruction to move the first moveable element to a third position distinct from the first and second positions; and
move the first moveable element to create a different layout of the image of the interface.

11. The medium of claim 8, further storing instructions configured to cause the processor to:
after capturing the image of the interface, receive an instruction to move the moveable element to a new position; and
update the image of the interface with the movable element at the new position.

12. The medium of claim 8, further storing instructions configured to cause the processor to add a new graphical element to the image of the interface.

13. The medium of claim 8, wherein a layout of the image of the interface is at least partially defined by a layout parameter, and further storing instructions configured to cause the processor to:
access information from a social networking account for at least one of the participants in the video call; and
use the accessed information to set the layout parameter.

14. The medium of claim 8, wherein transmitting the captured picture as part of the video call comprises reducing a quality of the picture, and the captured picture stored in the moveable graphical element is of a higher quality than the transmitted captured picture.

15. An apparatus, comprising:
a camera configured to capture a picture;
a memory configured to store the captured picture;
a network interface configured to transmit the captured picture as part of a video call;
a processor configured to:
receive an instruction to capture an image of an interface of the video call;

capture information describing the interface;

retrieve the captured picture in the memory of the device;

store the captured picture as a moveable graphical element in an interface structure with the information describing the interface; and respond to the instruction with the interface structure.

16. The apparatus of claim 15, wherein the moveable element is a first moveable element, and the processor is further configured to:

position the first moveable element at a first position on the image of the interface and positioning a second moveable element at a second position on the image of the interface;

receive an instruction to move the first moveable element to the second position; and rearrange the first moveable element and the second moveable element while maintaining a same layout of the image of the interface.

17. The apparatus of claim 15, wherein the moveable element is a first moveable element, and the processor is further configured to:

position the first moveable element at a first position on the image of the interface and positioning a second moveable element at a second position on the image of the interface;

receive an instruction to move the first moveable element to a third position distinct from the first and second positions; and move the first moveable element to create a different layout of the image of the interface.

18. The apparatus of claim 15, wherein the processor is further configured to:

after capturing the image of the interface, receive an instruction to move the moveable element to a new position; and update the image of the interface with the movable element at the new position.

19. The apparatus of claim 15, wherein the processor is further configured to add a new graphical element to the image of the interface.

20. The method of claim 1, wherein a layout of the image of the interface is at least partially defined by a layout parameter, and the processor is further configured to:

accessing information from a social networking account for at least one of the participants in the video call; and using the accessed information to set the layout parameter.

* * * * *